(12) United States Patent
Wigren et al.

(10) Patent No.: US 11,963,130 B2
(45) Date of Patent: Apr. 16, 2024

(54) DEVICE TYPE STATE ESTIMATION

(71) Applicant: Telefonaktiebolaget LM Ericsson (publ), Stockholm (SE)

(72) Inventors: Torbjörn Wigren, Uppsala (SE); Sholeh Yasini, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 320 days.

(21) Appl. No.: 17/594,670

(22) PCT Filed: Apr. 26, 2019

(86) PCT No.: PCT/SE2019/050377
§ 371 (c)(1),
(2) Date: Oct. 25, 2021

(87) PCT Pub. No.: WO2020/218957
PCT Pub. Date: Oct. 29, 2020

(65) Prior Publication Data
US 2022/0210762 A1    Jun. 30, 2022

(51) Int. Cl.
*H04W 64/00* (2009.01)
*B64C 39/02* (2023.01)
*G01S 11/02* (2010.01)

(52) U.S. Cl.
CPC ......... *H04W 64/006* (2013.01); *B64C 39/024* (2013.01); *G01S 11/02* (2013.01)

(58) Field of Classification Search
None
See application file for complete search history.

(56) References Cited

U.S. PATENT DOCUMENTS

| | | | |
|---|---|---|---|
| 2009/0231183 A1* | 9/2009 | Nettleton | G01S 13/726 342/95 |
| 2015/0208228 A1 | 7/2015 | Koskinen et al. | |
| 2015/0215742 A1* | 7/2015 | Ikeda | H04W 68/02 455/456.1 |
| 2020/0331590 A1 | 10/2020 | Yuksel | |
| 2022/0187793 A1 | 6/2022 | Berntorp et al. | |

FOREIGN PATENT DOCUMENTS

| | | |
|---|---|---|
| CN | 104602218 A | 5/2015 |
| WO | 2018/156696 A1 | 8/2018 |

(Continued)

OTHER PUBLICATIONS

International Preliminary Report on Patentability, PCT App. No. PCT/SE2019/050377, dated Nov. 4, 2021, 9 pages.

(Continued)

*Primary Examiner* — Frantz Bataille
(74) *Attorney, Agent, or Firm* — Nicholson De Vos Webster & Elliott LLP

(57) ABSTRACT

A method for type state estimation of a user equipment connected to a wireless communication network. The method comprises updating, recursively, of a type state estimate. The type state estimate is a probability for the user equipment to be a drone conditioned on obtained kinematic state estimate updates concerning the user equipment. The user equipment is assigned to be a drone as a response on the type state estimate exceeding a threshold.

15 Claims, 13 Drawing Sheets

(56) References Cited

FOREIGN PATENT DOCUMENTS

| | | |
|---|---|---|
| WO | 2019004925 A1 | 1/2019 |
| WO | 2020218958 A1 | 10/2020 |

OTHER PUBLICATIONS

International Preliminary Report on Patentability, PCT App. No. PCT/SE2019/050379, dated Nov. 4, 2021, 21 pages.
International Search Report and Written Opinion, PCT App. No. PCT/SE2019/050377, dated Jan. 23, 2020, 11 pages.
International Search Report and Written Opinion, PCT App. No. PCT/SE2019/050379, dated Nov. 18, 2019, 23 pages.
James Hare et al., "Distributed Smart Sensor Scheduling for Underwater Target Tracking," 2014, 6 pages, IEEE.
Hui Long et al., "Dynamic Nearest Neighborhood Collaboration Target Tracking for WSN," 2011, pp. 707-714, SciVerse ScienceDirect, Energy Procedia 11, Elsevier Ltd.
Henrik Ryden et al., "Rogue Drone Detection: A Machine Learning Approach," 2019, 6 pages, IEEE Wireless Communications and Networking Conference (WCNC).
Jennifer Sander et al., "High-level data fusion component for drone classification and decision support in counter UAV," 2018, 10 pages, Proc. of SPIE vol. 10651, 106510F.
Torbjorn Wigren, "Wireless Hybrid Positioning Based on Surface Modeling with Polygon Support," 2018, 7 pages, IEEE.
Non-Final Office Action, U.S. Appl. No. 17/594,671, Nov. 2, 2023, 13 pages.
Notice of Allowance, U.S. Appl. No. 17/594,671, Feb. 20, 2024, 10 pages.
Office Action, CN App. No. 201980095826.1, Dec. 26, 2023, 12 pages of Original Document Only.

\* cited by examiner

Fig. 8
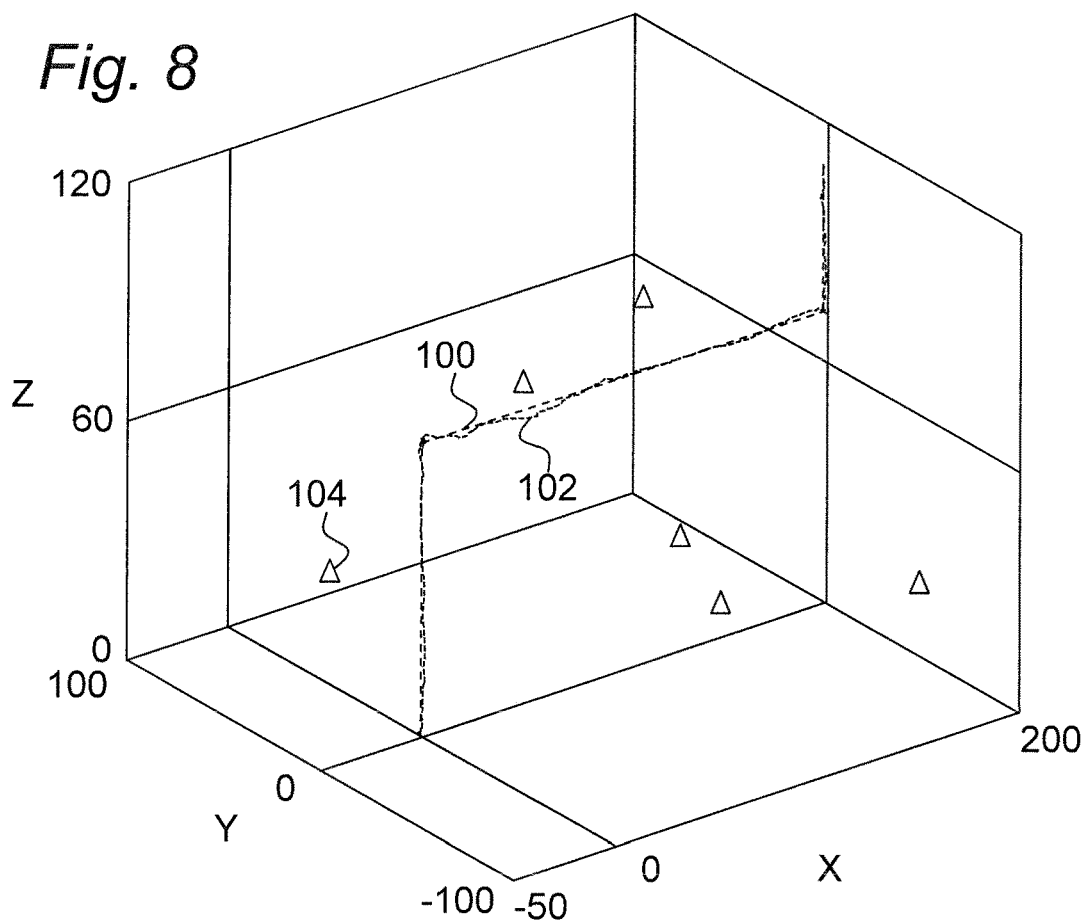
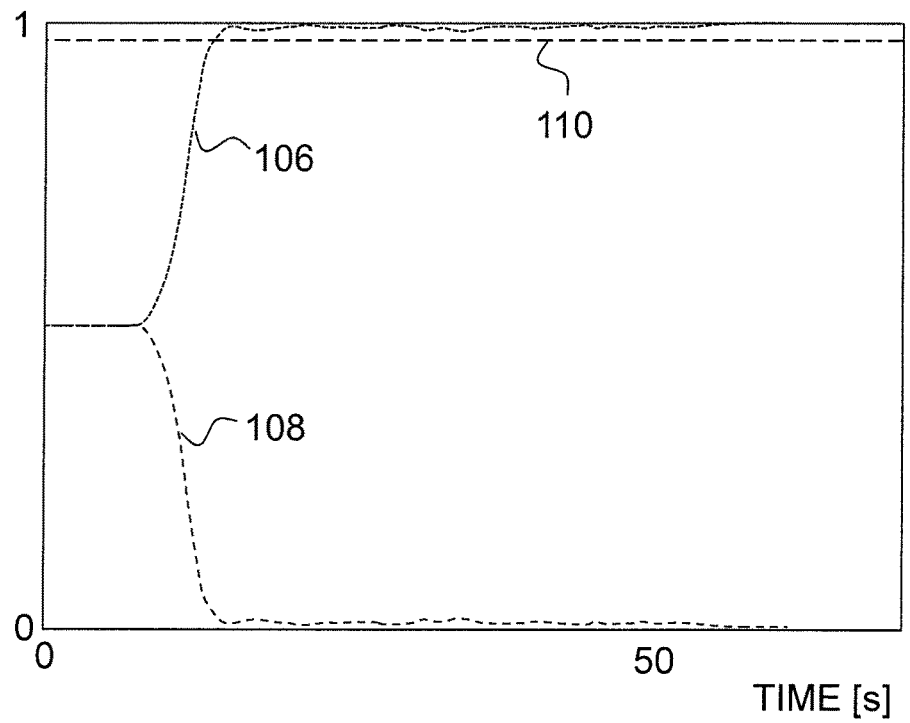
Fig. 9

DEVICE TYPE STATE ESTIMATION

CROSS-REFERENCE TO RELATED APPLICATIONS

This application is a National stage of International Application No. PCT/SE2019/050377, filed Apr. 26, 2019, which is hereby incorporated by reference.

TECHNICAL FIELD

The proposed technology generally relates to devices and methods for device type state estimation in a wireless communication system and in particular to devices and methods for drone estimation.

BACKGROUND

Today, airborne radio-controlled drones are becoming more and more common. These so-called drones have in the past been limited to stay within range of the radio control equipment dedicated to control the drone.

However, recently functionality allowing drones to be remotely controlled over the cellular network has increased their range considerable. This can e.g. be achieved by attaching a Long-Term Evolution (LTE) User Equipment (UE) to the drone and by coupling the UE to the navigation system of the drone. This way, the drone is enabled to travel over multiple cells resulting in ranges that is limited only by the battery of the drone. In some markets, this is already being regulated, and UEs attached to drones are registered as such. However, a large amount of users fail to register, such users being denoted as "rogue drones".

The LTE, or in the future New Radio (NR), capable drones need to be restricted in terms of their flight. This is particularly the case for rogue drones.

A first reason for this is that rogue drones that transmit and receive cellular radio messages at significant altitudes, tend to create more interference than ground-based UEs, simply because there are less obstacles when the altitude of the drone is significant, propagation can then be close to free-space propagation. The interference therefore reaches further and creates interference problems also in adjacent cells. At higher altitudes, drones may also be served by the sidelobes of radio base station antennas that are downtilted. This may increase the risk of sudden signal changes.

A second reason is that rogue drones create hazardous situations when flying illegally in certain parts of the airspace. Examples include airports, where commercial air traffic may be at danger, military restricted areas, and the airspace over densely populated areas where a crash would be likely to cause human injuries. On Dec. 20, 2018, Gatwick International Airport, London, UK was e.g. closed down due to rogue drone presence. The severity of the problem, and the urgency of developing solutions to counter illegal flight cannot be underestimated.

In order to prevent the problems described above, there has to be found a way to identify and locate the drones and in particular the rouge drones.

SUMMARY

It is an object to provide methods and devices for determining if a device comprising a user equipment is a drone.

This and other objects are met by embodiments of the proposed technology. The above problems are solved by performing type state estimation of user equipments within a wireless communication system.

According to a first aspect, there is provided a method for type state estimation of a user equipment connected to a wireless communication network. The method comprises updating, recursively, of a type state estimate. The type state estimate is a probability for the user equipment to be a drone conditioned on obtained kinematic state estimate updates concerning the user equipment. The user equipment is assigned to be a drone as a response on the type state estimate exceeding a threshold.

According to a second aspect, there is provided a network node, configured for type state estimation of a user equipment connected to a wireless communication network to which the network node is connected. The network node is configured to recursively update a type state estimate. The type state estimate is a probability for the user equipment to be a drone conditioned on obtained kinematic state estimate updates concerning the user equipment. The network node is further configured to assign the user equipment to be a drone as a response on the type state estimate exceeding a threshold.

According to a third aspect, there is provided a wireless communication network, comprising at least one network node according to the second aspect.

According to a fourth aspect, there is provided a computer program comprising instructions, which when executed by at least one processor, cause the processor(s) to recursively update a type state estimate. The type state estimate is a probability for the user equipment to be a drone conditioned on obtained kinematic state estimate updates concerning the user equipment. The instructions, when executed by the processor(s), further cause the processor(s) to assign the user equipment to be a drone as a response on the type state estimate exceeding a threshold.

According to a fifth aspect, there is provided a computer-program product comprising a computer-readable medium having stored thereon a computer program of the fourth aspect.

An advantage of the proposed technology is that a drone can be identified.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 8 is a diagram showing true trajectory, estimated trajectory and

FIG. 9 is a diagram illustrating results of a UE type probability estimation according to FIG. 8;

DETAILED DESCRIPTION

Throughout the drawings, the same reference designations are used for similar or corresponding elements.

Since drones controlled by a user equipment (UE) are operated by utilizing a wireless communication system it would be convenient also to use the wireless communication system for identifying which UEs that are connected to drones.

As mentioned above, registration is one means for keeping track on drone UEs. However, as also mentioned above, such a registration is easily neglected, either accidentally or on purpose. It is thus not possible to rely completely on such registration requests.

Since wireless communication systems are designed to cope with moving objects, there are different kinds of kinematic information of UEs available in different parts of a wireless communication system. Useful kinematic information could e.g. comprise distance measurements or even location determinations. Such kinematic information could be utilized to estimate e.g. positions of a UE. However, the same type of kinematic information would also be possible to combine into information about motion properties of a UE. In other words, an estimation of a kinematic state could be performed, if the right information and estimation techniques would be available.

Once having access to kinematic state estimations of UEs, different kinds of motion patterns can be extracted. Since a drone, at least in some aspects and in some situations, have unique kinematic behaviours, a combination of kinematic information with knowledge about these unique features of drones, a type state estimation is possible to perform.

Figure 1:
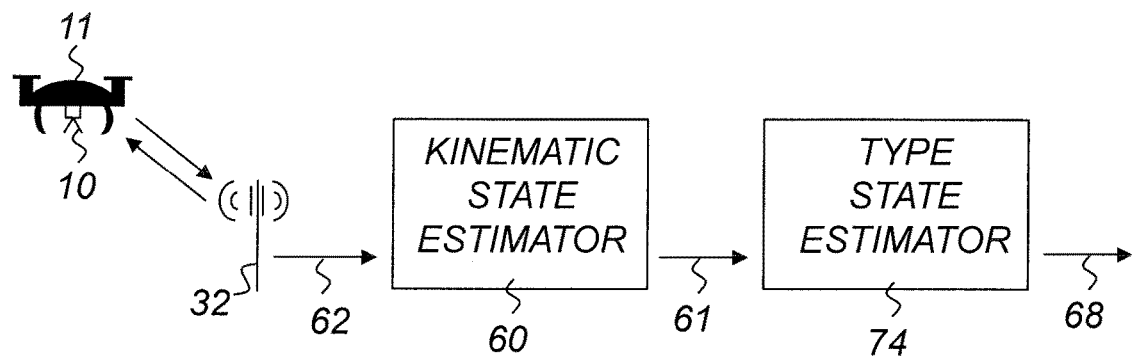
FIG. 1 is a schematic illustration of the drone detection principle.

The drone state estimation problem treated by this is schematically illustrated in FIG. 1. A drone 11, comprising a UE 10 moves e.g. in a restricted area. The drone 11 communicates via base stations, e.g. eNBs/gNBs 32, which provides noisy kinematic measurements 62. These kinematic measurements 62 can e.g. be the range between respective eNB/gNB 32 and the drone. A UE kinematic state estimator 60 uses these noisy kinematic measurements 62 to provide kinematic state estimations 61. A UE type state estimator 74 can analyze the state estimations 61 and, by using knowledge of the characteristic movements of a drone 11, determine that the UE 10 has to be attached to a drone 11.

Different kinds of measures can thus be performed based on drone type information 68.

As will be considered here below, the first parts of this chain, i.e. the measurements and kinematic state estimation can be provided within the wireless communication system. Enabling examples will be presented. However, the present ideas are concentrated on the last part, i.e. the type state estimation. In this context, the detailed manner in which the first processes are performed is not of crucial importance as long as the suitable resulting information therefrom is available.

As mentioned briefly above, different kinds of measurements can be utilized to create kinematic state estimations. One example is range measurements, i.e. measurements of quantities that are related to the distance between a stationary network node and a UE. There are several possibilities for range measurement. One way is to perform path loss measurements. That is, however, generally not accurate enough for the present applications, since the path loss is affected by radio fading and since range needs to be computed from an assumed radio propagation model. However, in particular applications, e.g. where the radio fading is well modelled, path loss measurements may contribute with an acceptable range measurement.

A better and more accurate basis for measurement of range is typically to measure the travel time of radio waves to/from a base station and a UE. One alternative is then to measure the travel time of radio waves from a base station to a UE and back, i.e. a round-trip-time (RTT) measurement. A description of the principles of RTT measurements is disclosed in Appendix A.

The measurements discussed above can thus be utilized for estimation purposes. The technical field of moving object kinematic state estimation is, as such, mature today, with many operational systems worldwide. See for example any of the many available textbooks on the subject. One alternative is a so-called multi-sensor state estimation system. This is further described in Appendix B.

To be able to accurately estimate the movement, i.e. the kinematic state, of a drone, it is first realized that drones fly in very specific ways. These modes of movement need to be reflected by the optimal estimator applied for measurement processing. Some alternatives of kinematic state estimations are described in Appendix C.

The modes of movement are preferably adapted to the application, where they are employed. In the present case, the modes of movement should therefore preferably model movements that are of most benefit for any state estimation processes. Thus, when dealing with drone detection, the movement mode model should reflect characteristic features of a drone movement. In Appendix F, one possible 3-mode model is presented, which is believed to be one suitable approach for obtaining useful kinematic state estimations.

The general problem is illegal flying of the so-called rogue drones. There are, today in existing wireless communication systems, a number of lacking items that prevent a gNB-only implementation of a state estimation system for such rogue drones. However, as indicated in the Appendices, there are possible methods that allow for kinematic state estimations of UEs. Preferably, these kinematic state estimations are adapted for UEs connected to drones. The kinematic state estimates typically comprise estimated positions, typically expressed in x, y, and z coordinates relative a ground surface. Preferably, the kinematic state estimates also comprises estimated velocities, typically in the x, y, and z directions.

In one embodiment, the kinematic state estimate comprises estimated positions and velocities, and covariances therefore, as well as mode probability information.

However, also a drone type state estimation procedure has to be presented, which is the main objective for the technology presented here. Such a new drone type estimation algorithm should arrange for discrimination between airborne rogue drones, and terrestrial moving and fix UEs, like laptops, pedestrians, users in cars and trains. A detection algorithm is as mentioned above based on kinematic state estimates, typically obtained in a single gNB or eNB. Preferably, the kinematic state estimates are based on movement mode estimates and a ground altitude model. The novel drone detection presented here is preferably using new Bayesian processing of estimated rogue drone states.

Models for calculation of the altitude above mean sea level of the ground will be useful to define the technology. A first example of such a system would be a complete geographical information system (GIS) that consist of ground altitude maps covering the region of the cellular system. A second example would be to use a configured ground altitude, for each antenna site of the cellular system. A third example would be to use a model of the ground altitude, valid in the interior of each cell of the cellular system, obtained by the method of [1] T. Wigren, "Wireless hybrid positioning based on surface modeling with polygon support", Proc. VTC 2018 Spring, Porto, Portugal, June, 2018.

In the description below, it is assumed that the altitude coordinate represents an altitude above ground. In other words, the altitude is an altitude over sea level adjusted for the ground level at each point. Thus, from now on, it is assumed that the ground altitude is subtracted from the estimated altitude.

A note on discretization may be useful for the reader. The models discussed in the detailed description of the present technology, are defined in continuous time, using differential equations. For computer implementation, they need to be discretized. Given a continuous time Wiener process:

$$dx = Axdt + Bd\hat{v} \quad (1)$$

where x is the state, A is a systems matrix, B is a disturbance gain matrix and v is the disturbance. It follows that the discrete time state equation after sampling with the sampling period T is:

$$x(k+1) = F_i x(k) + v(k) \quad (2)$$

where $$F_i = e^{A_i T}, i=1,2,3 \quad (3)$$

$$v(k) = \int_0^T e^{A(T-\tau)} B_i \hat{v}(kT+\tau) d\tau, i=1,2,3 \quad (4)$$

and with the discretized process noise covariance:

$$Q = \mathbb{E}[v(k)v(k)']. \quad (5)$$

It is assumed in the present disclosure that all continuous time equations are discretized like this.

When Bayesian methods are used for detection of a rogue drone, the probability of each type or set of types of objects are estimated, based on a set of features. These features are selected to be typical for the type in question. Kinematic capabilities can e.g. be exploited. However, such features are usually based on hard tabulated information without uncertainty, which is a problem of the present field of technology.

Figure 6:
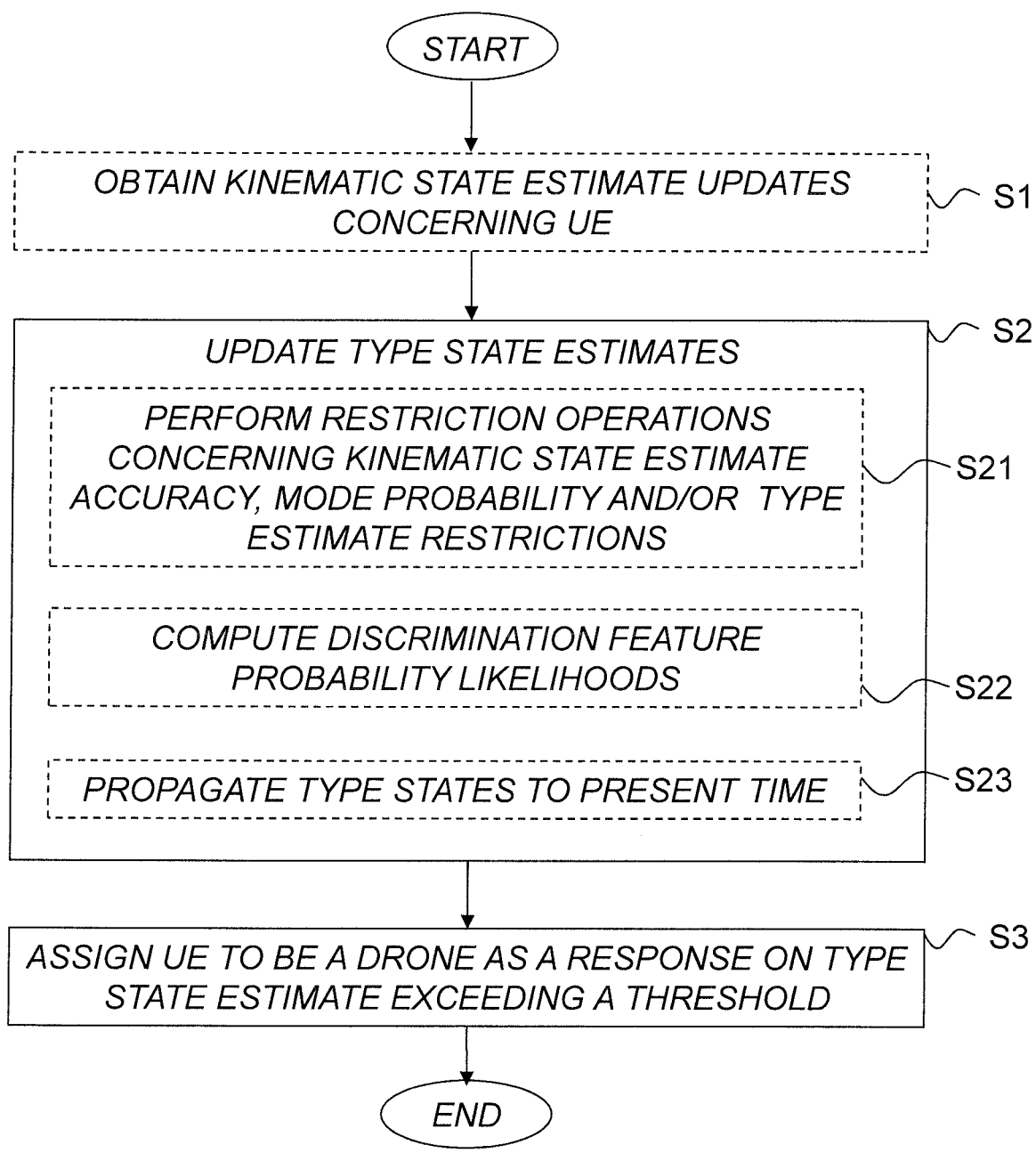
FIG. 6 is a schematic flow diagram illustrating steps of an embodiment of a method for type state estimation of a UE connected to a wireless communication network.

FIG. 6 illustrates a flow diagram of steps of an embodiment of a method for type estimation of a UE connected to a wireless communication network. In step S2, a type state estimate is recursively updated. The type state estimate is a probability for the UE to be a drone conditioned on obtained kinematic state estimate updates concerning the UE.

In a preferred embodiment, a model with two type states is used. One type state is the probability for the UE to be a drone conditioned on obtained kinematic state estimate updates concerning the UE and the other type state is a probability for the UE not to be a drone conditioned on obtained kinematic state estimate updates concerning the UE.

In step S3, the UE is assigned to be a drone as a response on the type state estimate for the UE to be a drone exceeding a threshold.

In a preferred embodiment, the kinematic state estimate updates used in step S2 for performing the updates can be obtained, as indicated by step S1, in different ways by the node performing the step S2. This obtaining may e.g. comprise receiving of kinematic state estimate updates from another node, retrieving kinematic state estimate updates from a storage or by performing the actual estimation giving the kinematic state estimate updates.

In a preferred embodiment, two UE types are thus distinguished, namely a drone UE and a "terrestrial" UE. The latter is referred to as 'not drone'. In the mathematical description below, these are denoted as D and ¬D, respectively. The first state is thus selected to be $P(D|z^t) \propto P(z^t|D) P(D)$, i.e. the probability of a drone, conditioned on the measurements. Analogously, the second state is selected to be $P(\neg D|z^t) \propto P(z^t|\neg D) P(\neg D)$-, i.e. the probability of not being a drone, conditioned on the measurements. Above ∝ means "is proportional to".

In the first transformation of these states, Bayes rule is used to decompose the states into a likelihood of the measurement set $z^t$, multiplied with the prior probability.

The UE type states need to be updated, when the kinematic state estimate 2 of the associated UE is updated. To see how and to define the involved approximations, it can be written:

$$P(D|z^t) = P(D|z(t), z^{t-1}) \propto P(z(t)|D, z^{t-1}) P(D|z^{t-1}) \approx P(z(t)|D) P(D|z^{t-1}) \approx P(I(\hat{x}, f)|D) P(D|z^{t-1}). \quad (6A)$$

Given the motivation of FIG. 1, the likelihood is hence thought of as a likelihood of the estimated IMM state, which should according to estimation theory, ideally contain all the information of the object. The likelihood is then expressed as a function of an indicator function $I(\hat{x}, f)$, with the likelihood being (close to) a maximum value whenever the state is consistent with the set of discrimination features f. The discrimination features are features of the kinematic state estimate that distinguish the typical behavior of a drone UE from a non-drone UE. The set of discrimination features, the evaluation of the likelihood, and the update of the states are elaborated here further below.

In one embodiment, the step S2 of FIG. 6 comprises the part step S22, where discrimination feature probability likelihoods are computed.

The implication of the above equation is that, provided that the likelihood is computed, then $P(D|z^t)$ can be computed from $P(D|z^{t-1})$ with iteration over the time t. The defining equation shows that the iteration is to be initialized with the prior probability. A truly recursive detection algorithm has then been obtained.

In the two-type-state embodiment above, the other state update iteration follows similarly as:

$$P(\neg D|z^t) \approx P(I(\hat{x},f)|\neg D)P(\neg D|z^{t-1}). \quad (6)$$

The two type components are initialized:

$$P(t_0, D|z^0) = P_D \quad (7A)$$

$$P(t_0, \neg D|z^0) = 1 - P_D, \quad (7B)$$

and iterate for t:=t+T.

The final step of the update is a normalization step, intended to keep the sum of the state type probabilities equal to one, i.e.:

$$P_{norm}(D|z^t) = \frac{p(D|z^t)}{p(D|z^t) + p(\neg D|z^t)} \quad (8A)$$

$$P_{norm}(\neg D|z^t) = \frac{p(\neg D|z^t)}{p(D|z^t) + p(\neg D|z^t)} \quad (8B)$$

followed by:

$$P(D|z^t) = P_{norm}(D|z^t) \quad (9A)$$

$$P(\neg D|z^t) = P_{norm}(\neg D|z^t). \quad (9B)$$

After this everything is set for a new iteration.

In other words, in one embodiment, an updated type state estimate is equal to a preceding type state estimate probability multiplied with a likelihood of the obtained kinematic state estimate updates and normalized. The likelihood is a probability of a smooth indicator function, representing a discrimination feature of the kinematic state estimate, where the likelihood is conditioned on the UE being a drone.

In a further embodiment, the recursively updating of the type state estimate is performed according to: $P(D|z^t) \propto P(I(\hat{x}, f)|D)P(D|z^{t-1})$, where $P(D|z^t)$ is the probability for the UE to be a drone conditioned on a present kinematic state estimate update, $P(D|z^{t-1})$ is the probability for the UE to be a drone conditioned on a preceding kinematic state estimate update and $P(I(\hat{x}, f)|D)$ is the likelihood of the obtained kinematic state estimate update. $I(\hat{x}, f)$ is the smooth indicator function. $\hat{x}$ is the kinematic state estimate and f is the feature for which the likelihood is evaluated, and t is the time.

In a preferred embodiment, where a model with two type states is used, an updated type state estimate of the state of the UE not being a drone is equal to a preceding type state estimate probability multiplied with a likelihood of the obtained kinematic state estimate updates and normalized. The likelihood is a probability of a smooth indicator function, representing a discrimination feature of the kinematic state estimate, where the likelihood is conditioned on the UE not being a drone.

In a further embodiment, the recursively updating of the type state estimate is performed according to $P(\neg D|z^t) \propto P(I(\hat{x}, f)|\neg D)P(\neg D|z^{t-1})$. $P(\neg D|z^t)$ is the probability for the UE to not be a drone conditioned on a present kinematic state estimate update, $P(\neg D|z^{t-1})$ is the probability for the UE to not be a drone conditioned on a preceding kinematic state estimate update and $P(I(\hat{x}, f)|\neg D)$ is the likelihood of the obtained kinematic state estimate update. $I(\hat{x}, f)$ is the smooth indicator function, $\hat{x}$ is the kinematic state estimate and f is the feature for which the likelihood is evaluated, and t is the time.

A preferred underpinning idea for a feature likelihood computation is to assume that the kinematic UE type discrimination features are independent and therefore the type probability update can be performed separately for each feature.

To illustrate the feature likelihood computations, a case with a discrimination feature connected to the altitude is first considered. The altitude of the kinematic state estimate $\hat{x}$, with the ground altitude model value subtracted, together with the uncertainty measure, e.g. a standard deviation is the object of the discrimination features. The selection is based on the fact that the altitude of a drone is often larger than the altitude of terrestrial users, in a cell of a cellular system.

The likelihood is given by $P(I(\hat{x}, h_{max})|D)$, where $h_{max}$ denotes a threshold altitude, c.f. eq. (6). Here the indicator function is assumed to be equal to unity in the altitude region that is consistent with the probability of drone and zero otherwise. It is thus assumed that every estimated altitude above the height $h_{max}$ refers to a drone UE and everything below (but above ground) may refer to a drone or a no drone. It's hence a step function in this exemplifying case. As is well known, such a step or Heaviside function can be generated by integration over a distribution consisting of a first positive Dirac delta function and a second negative Dirac delta function, i.e. in the case of altitude:

$$I(\hat{x}_3, h_{max}|\neg D) = \int_{-\infty}^{\hat{x}_3} (\delta(x_3 - 0) - \delta(x_3 - h_{max})) dx_3. \quad (10)$$

Figure 7:
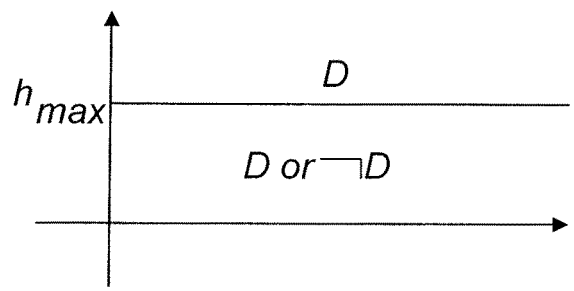
FIG. 7 is an illustration of an altitude discrimination feature.

This follows since a pedestrian or car cannot be located above altitude $h_{max}$, and not below the ground either, c.f. FIG. 7.

Now, this feature information is uncertain. The same is true for the state estimate. However, here it is assumed that kinematic state estimation uncertainty is accounted for by an increase of the feature information uncertainty. A further preferred underpinning idea is then to replace the Dirac delta functions in the equation above with probability distributions. The probability distributions then serve to smoothen the indicator function. For computational convenience, Gaussian one dimensional probability distribution functions are selected in the present embodiments. However, this is not intended to be considered as any limiting feature. Any other probability distribution function that models the uncertainties can be used as well.

The probability is then taken to be proportional to the indicator function. The computation of the feature likelihoods then follow:

$$P(\hat{x}_3, h_{max}|D) = \int_{-\infty}^{\hat{x}_3} \frac{1}{\sqrt{2\pi}\sigma_h} e^{-\frac{(x-0)^2}{2\sigma_h^2}} dx = \frac{1}{2} + \frac{1}{2}\text{erf}\left(\frac{\hat{x}_3}{\sqrt{2}\sigma_h}\right) \quad (11)$$

$$P(\hat{x}_3, h_{max}|\neg D) = \int_{-\infty}^{\hat{x}_3} \frac{1}{\sqrt{2\pi}\sigma_h} e^{-\frac{(x-0)^2}{2\sigma_h^2}} dx - \int_{-\infty}^{\hat{x}_3} \frac{1}{\sqrt{2\pi}\sigma_h} e^{-\frac{(x-h_{max})^2}{2\sigma_h^2}} dx = \quad (12)$$

$$= \frac{1}{2}\text{erf}\left(\frac{\hat{x}_3}{\sqrt{2}\sigma_h}\right) - \frac{1}{2}\text{erf}\left(\frac{\hat{x}_3 - h_{max}}{\sqrt{2}\sigma_h}\right),$$

where the Error Function erf(·) is defined as:

$$\text{erf}(x) = \frac{2}{\sqrt{\pi}} \int_0^x \exp(-z^2) dz. \quad (13)$$

The procedure is identical for other kinematic UE type discrimination features. Note that the likelihoods may not sum up to 1 since they are not normalized. The normalization is handled in a final step.

A set of useful kinematic UE type discrimination features, being associated with drone behavior, has been identified. One or several of the here below presented kinematic UE type discrimination features can be selected to be used in the procedure described above. In other words, the set of features used by the disclosed detection algorithm, is preferably a subset of at least the following functions of the state $\hat{x}$.

As has already been indicated, the altitude of the kinematic state estimate $\hat{x}$ with the ground altitude model value subtracted, can be used together with the uncertainty measure, e.g. a standard deviation as discussed below. The selection is based on the fact that the altitude of a drone is often larger than the altitude of terrestrial users, in a cell of a cellular system.

Another kinematic UE type discrimination feature is the altitude velocity of the kinematic state estimate $\hat{x}$, together with a feature uncertainty, e.g. a standard deviation discussed above. The selection is based on the fact that the altitude velocity of a drone is often larger than the altitude velocity of terrestrial users. Roads, do e.g. have a limited climb angle that limit the altitude velocity of cars. In scenarios with tall buildings the altitude velocity is particularly useful, since then the altitude may become ambiguous when it comes to distinguishing between indoor residents and a drone flying in between tall buildings.

The horizontal speed of the kinematic state estimate $\hat{x}$, together with a feature uncertainty, e.g. a standard deviation as discussed above, can also be used. The selection is based on the fact that cars tend to have higher maximum speeds than drones.

The magnitude of the acceleration of the kinematic state $\hat{x}$, together with a feature uncertainty e.g. a standard deviation as discussed above is another possibility. The selection is based on the fact that low weight drones can be much more agile in turns than e.g. a car or a pedestrian.

Also the horizontal position of the state vector $\hat{x}$, together with a feature uncertainty, e.g. a standard deviation as discussed above can be used. The selection is based on the fact that there are often horizontally restricted areas, e.g. known to be lakes, rivers or other areas where terrestrial users cannot enter, but where an air-borne drone can.

In other words, in one embodiment, the discrimination feature of the kinematic state estimate is selected from the list of:
  the altitude above ground of the kinematic state estimate;
  the altitude velocity of the kinematic state estimate;
  the horizontal speed of the kinematic state estimate;
  the horizontal position of the kinematic state estimate; and
  the magnitude of the acceleration of the kinematic state estimate.

In a further embodiment, the discrimination feature of the kinematic state estimate is modelled by a Gaussian probability distribution function in the smooth indicator function.

In order to further improve the accuracy of the estimate of type, it may preferably be useful to restrict the type update to only take place at times when the drone state estimate is accurate enough. This means that there is a need to assess the drone state estimate accuracy.

A first way to assess the accuracy of the drone state estimate, disclosed with the purpose to achieve an enhanced type estimate, is to compute the momentary accuracy of the drone state estimate based on at least one of the mode state covariance matrices $P^j(k|k)$, the mixed mode state covariances $P^{0j}(k-1|k-1)$, and the combined state covariance matrix $P(k|k)$. The following accuracy metrics may be used for this, where P denotes any of the above covariance matrices, c.f. the description of kinematic state estimation methods in the appendix:

The position accuracy: $Pos_{MSE}=\sqrt{P_{1,1}^2+P_{2,2}^2+P_{3,3}^2}$ (14A)

The velocity accuracy: $Vel_{MSE}=\sqrt{P_{4,4}^2+P_{5,5}^2+P_{6,6}^2}$ (14B)

The acceleration accuracy: $Acc_{MSE}=$
$\sqrt{P_{7,7}^2+P_{8,8}^2+P_{9,9}^2}$ (14C)

The altitude accuracy: $Alt_{MSE}=\sqrt{P_{3,3}^2}$ (14D)

The altitude velocity accuracy: $AltVel_{MSE}=\sqrt{P_{6,6}^2}$ (14E)

The horizontal velocity accuracy: $HorVel_{MSE}=$
$\sqrt{P_{4,4}^2+P_{5,5}^2}$ (14F)

Above, the first three measures provide a general accuracy assessment of the state estimate. Note that depending on which mode that is used for accuracy evaluation, only the measures above that can be computed in the respective mode are relevant. The first mode carries only position and velocity information, hence the acceleration accuracy cannot be evaluated for this mode. The first and final four accuracy measures are obviously related to each of the characterizing features disclosed above. Finally, note that there are many variations of the above accuracy measures. It would e.g. be possible to address the accuracy by means of e.g. a singular value decomposition of the matrix.

Preferably, it seems to make sense to restrict also the update of the type estimate to times when the kinematic state estimate indicates that the object is in stable movement, i.e. the mode probability. One way this is manifested is when there is a movement mode probability estimate that has one component close to 1, i.e. the probability is high for a unique movement mode. It may be that the UE travels with constant velocity, constant acceleration or performs hovering. In such cases, transient unmodeled movement is less likely, since the state estimate does not indicate an ongoing mode switch.

Hence, a suitable measure can e.g. be:

$$UniqueMode_1 = \max_i(\mu_i),$$ (15)

where $\mu_i$ is the mode probability update of the ith mode. It is noted that closeness to 1 for one mode, means closeness to 0 for all other modes. Hence the following measure would exploit the dual property to the measure above:

$UniqueMode_2=\pi_i\mu_i$. (16)

Both above measures are formulated for one instance in time. However, they may also be combined over an interval of time, to further enhance the accuracy of the type estimation.

Finally, note that again there are many functional forms of measures that achieve a similar objective, and the two measures above should not be considered as a limited set.

In other words, in one embodiment, step S2 of FIG. 6 of recursively updating the type state estimate is performed conditioned on at least one of a kinematic state estimate accuracy and kinematic mode probability. Thus, the step S2 of FIG. 6 comprises the part step S21, where restriction operations concerning kinematic state estimate accuracy, mode probability and/or type estimation restrictions are performed.

The type update can now be restricted in one embodiment by application of an algorithm that has the overall scope to exploit the kinematic state estimate only when the movement is stable and accurately estimated. The below algorithm is a further particular embodiment of such a procedure. However, this particular embodiment should not be considered as limiting. Rather, general algorithms for type update restriction, based on kinematic estimates obtained with IMM filtering or a similar multi-mode state estimation method are also applicable.

In a first step, it is checked that the movement mode i is stable. This can e.g. be done by the following check: If $\text{UniqueMode}_1(t) > \text{threshold}_1$ for all $t \in [t-T, t]$, then proceed to the next step, otherwise do not update the type. Note that an alternative check would be to check if $\text{UniqueMode}_2(t) < \text{threshold}_2$ for all $t \in [t-T, t]$.

In a second step, it is checked if the position estimate is accurate enough. This means that it is checked if $\text{Pos}_{MSE} < \text{threshold}_3$ allow type update using the horizontal position represented by the kinematic state estimate. Proceed to the third step.

In the third step, it is checked if the altitude information is accurate enough. If $\text{Alt}_{MSE} < \text{threshold}_6$ allow type update using the altitude of the kinematic state estimate with the ground altitude model value subtracted. Proceed to the fourth step.

In the fourth step it is checked if the altitude velocity information is accurate enough. If $\text{AltVel}_{MSE} < \text{threshold}_7$ allow type update using the altitude velocity of the kinematic state estimate. Proceed to the fifth step.

In the fifth step it is checked if the horizontal velocity information is accurate enough. If $\text{HorVel}_{MSE} < \text{threshold}_8$ allow type update using the horizontal speed of the kinematic state estimate. Proceed to the sixth step.

In the sixth step it is checked if the acceleration information is accurate enough. If $\text{Acc}_{MSE} < \text{threshold}_5$ allow type update using the magnitude of the acceleration of the kinematic state. Proceed to the seventh step.

In the seventh step type update is performed using all allowed features.

The above checks are to be interpreted as optional. In practice they may all be included, and optionality being controlled with the predetermined threshold values.

Typically, old information needs to be discarded when kinematic state estimation is performed. This is preferably achieved by the well-known compromise between the sizes of the systems noise covariance matrix and the measurement covariance matrix in each EKF mode of the present IMM filter.

Information discarding may preferably also be needed in the type estimation. One way to achieve this is to assume linear diffusion of type probabilities towards a constant probability vector, typically with equal probability for each type alternative. Considering the time interval $[t, t+\Delta t]$ it follows that:

$$P(t+\Delta t, D|z^t) - P(t,D|z^t) \approx -\alpha P(t,D|z^t)\Delta t + \alpha P_D \Delta t. \quad (17)$$

Here $\alpha$ is a pre-determined constant and $P_D$ is the constant drone probability used initially. Letting the time interval approach zero renders a linear differential equation with solution:

$$P(t+T,D|z^t) = P_D + (P(t,D|z^t) - P_D)\alpha^{-\alpha T}. \quad (18)$$

This equation can be used to propagate the probability of drone between two update time instances. An equivalent equation can be derived for the probability of not a drone.

In other words, in one embodiment, the method for type estimation comprises the further step of propagating the type state estimate to a present time. This is illustrated as step S23 in FIG. 6.

In a further embodiment, the step of propagating the type state estimate to a present time comprises diffusion of type probabilities towards a constant probability vector.

In a further embodiment, the step of propagating the type state estimate to a present time is performed according to $P(t+T, D|z^t) = P_D + (P(t, D|z^t) - P)\alpha^{-\alpha T}$, where $P(t+T, D|z^t)$ is the type state estimate of a present time, $P(t, D|z^t)$ is the type state estimate of a previous time, $P_D$ is the constant probability vector and $\alpha$ is a predetermined propagation constant.

In one embodiment, a complete type filtering algorithm starts with initiation of the type states. IMM state, covariance and mode probability information is read. Type update restriction measures are computed. Type update restriction checks are performed. Feature probability likelihoods are computed. Type probabilities are updated. Finally, type states are propagated from t to t+T.

The assigning of a UE to be a drone UE can be done in many ways. The simplest and preferred embodiment is to declare that the state estimate represents a drone, as soon as:

$$P(D|z^t) > \text{threshold}_{assign} \quad (19)$$

where $\text{threshold}_{assign}$ is a predetermined assigning threshold slightly less than 1.

A numerical illustration is given here below to illustrate the operation and performance of the proposed preferred algorithm. For this simulation scenario discrimination features depending on altitude and altitude velocity have been used for UE type estimation.

State Estimation Scenario:
Drone starts at initial position [0 0 0] with the initial velocity [0 0 0].
Drone continues with constant acceleration (increasing velocity) for 5 s upwards (mode 1).
Drone continues with constant acceleration (increasing velocity) for 5 s upwards (mode 1).
Drone hovers for 10 s.
Drone accelerates with constant acceleration (increasing velocity) towards the right for 20 s.
Drone hovers for 5 s.
Drone continues upwards for 10 s.
Site Positions:
$S_1 = (50\ 100\ 5)^T$
$S_2 = (100\text{-}50\ 30)^T$
$S_3 = (80\text{-}50\ 50)^T$
$S_4 = (150\text{-}100\ 40)^T$
$S_5 = (30\ 0\ 100)^T$
$S_5 = (100\ 20\ 120)^T$
Parameters:
T=1 second
n=60 number of discrete time steps
Noise variances $r_1 = r_2 = r_3 = 1$ m
Unique mode threshold $\text{threshold}_1 = 0.3$
Altitude threshold $\text{threshold}_6 = 10$
Altitude uncertainty $\sigma_h = 1$
Altitude velocity threshold $\text{threshold}_7 = 7$
Altitude velocity uncertainty $\dot{\sigma}_h = 1$
Process noise variances for constant velocity, acceleration and hovering models are:
$q_{11} = q_{12} = q_{13} = 0.001$,
$q_{21} = q_{22} = q_{23} = 1.0$,
$q_{31} = q_{32} = q_{33} = 0.01$ IMM Transition Probability Matrix:

$$p_{ij} = \begin{bmatrix} 0.98 & 0.05 & 0.001 \\ 0.5 & 0.80 & 0.05 \\ 0.1 & 0.06 & 0.95 \end{bmatrix}$$

Initial Conditions:
$X_0^1 = [0\ 0\ 0\ 0\ 0\ 1]'$
$P_0^1 = \text{diag}([100\ 100\ 100\ 4\ 4\ 4])$
$X_0^2 = [0\ 0\ 0\ 0\ 0\ 1\ 0\ 0\ 0]'$
$P_0^2 = \text{diag}([100\ 100\ 100\ 4\ 4\ 4\ 1\ 1\ 1])$
$X_0^3 = [0\ 0\ 0]'$
$P_0^3 = \text{diag}([100\ 100\ 100])$ The result of the drone tracking simulation is shown in FIG. 8, which illustrates the true state trajectory as a broken line 100, the IMM filtered trajectory as a dotted line 102, and the site positions as triangles 104. It can be seen that the IMM filtered trajectory 102 with a high degree of accuracy follows the true state trajectory 100.

FIG. 9 shows the UE type state estimation. The broken line 108 denotes the "no drone" probability and the dotted line 106 denotes the "drone" probability. It can be seen that already after almost 12 s the UE type states probability converges to the true values. The line 110 may indicate a suitable position of an assigning threshold threshold$_{assign}$.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a network node configured for type estimation of a UE connected to the wireless communication network to which the network node is connected. The network node is configured to recursively update a type state estimate. The type state estimate is a probability for the UE to be a drone conditioned on obtained kinematic state estimate updates concerning said UE. The network node is further configured to assign the UE to be a drone as a response on the type state estimate exceeding a threshold.

Figure 10:
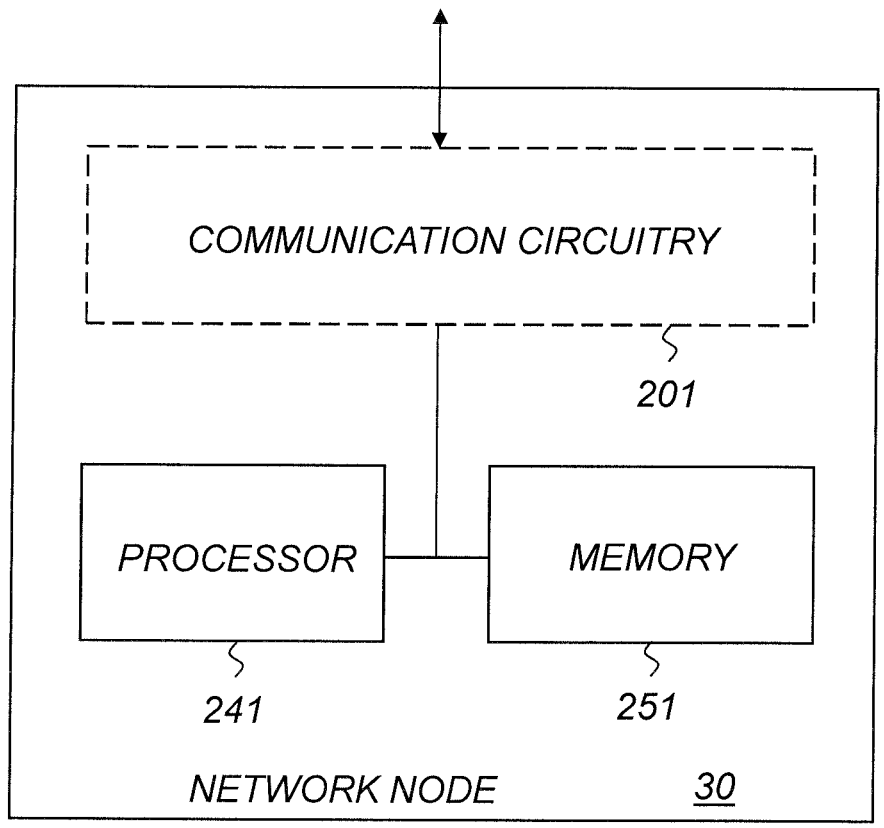
FIG. 10 is a schematic block diagram illustrating an embodiment of a network node.

FIG. 10 is a schematic block diagram illustrating an example of a network node 30, based on a processor-memory implementation according to an embodiment. In this particular example, the network node 30 comprises a processor 241 and a memory 251, the memory 251 comprising instructions executable by the processor 241, whereby the processor 241 is operative to recursively update the type state estimate and to assign the UE to be a drone.

Optionally, the network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s).

In one embodiment, an updated type state estimate is equal to a preceding type state estimate probability multiplied with a likelihood of the obtained kinematic state estimate updates and normalized. The likelihood is a probability of a smooth indicator function, representing a discrimination feature of the kinematic state estimate, where the likelihood is conditioned on the UE being a drone.

In a further embodiment, the network node is further configured to perform the recursively updating of the type state estimate according to $P(D|z^t) \propto P(I(\hat{x}, f)|D)P(D|z^{t-1})$, where $P(D|z^t)$ is the probability for the UE to be a drone conditioned on a present kinematic state estimate update, $P(D|z^{t-1})$ is the probability for the UE to be a drone conditioned on a preceding kinematic state estimate update and $P(I(\hat{x}, f)|D)$ is the likelihood of the obtained kinematic state estimate update, $I(\hat{x}, f)$ is the smooth indicator function, $\hat{x}$ is the kinematic state estimate and f is the feature for which the likelihood is evaluated, and where t is the time.

In one embodiment, a model with two type states is used. One type state is the probability for the UE to be a drone conditioned on obtained kinematic state estimate updates concerning the UE. The other type state is a probability for the UE not to be a drone conditioned on obtained kinematic state estimate updates concerning the UE.

In a further embodiment, an updated type state estimate of the state of the UE not being a drone is equal to a preceding type state estimate probability multiplied with a likelihood of the obtained kinematic state estimate updates and normalized. The likelihood is a probability of a smooth indicator function, representing a discrimination feature of the kinematic state estimate, where the likelihood is conditioned on the UE not being a drone.

In a further embodiment, the network node is further configured to perform the recursively updating of the type state estimate according to $P(\neg D|z^t) \propto P(I(\hat{x}, f)|\neg D)P(\neg D|z^{t-1})$, where $P(\neg D|z^t)$ is the probability for the UE to not be a drone conditioned on a present kinematic state estimate update, $P(\neg D|z^{t-1})$ is the probability for the UE to not be a drone conditioned on a preceding kinematic state estimate update and $P(I(\hat{x}, f)|\neg D)$ is the likelihood of the obtained kinematic state estimate update, $I(\hat{x}, f)$ is the smooth indicator function, $\hat{x}$ is the kinematic state estimate and f is the feature for which the likelihood is evaluated, and where t is the time.

In one embodiment, the discrimination feature of the kinematic state estimate is selected from the list of:
the altitude above ground of the kinematic state estimate;
the altitude velocity of the kinematic state estimate;
the horizontal speed of the kinematic state estimate;
the horizontal position of the kinematic state estimate; and
the magnitude of the acceleration of the kinematic state estimate.

In one embodiment, the discrimination feature of the kinematic state estimate is modelled by a Gaussian probability distribution function in the smooth indicator function.

In one embodiment, the network node is further configured to perform the recursively updating of the type state estimate conditioned on at least one of a kinematic state estimate accuracy and kinematic mode probability.

In one embodiment, the network node is further configured to propagate the type state estimate to a present time.

In a further embodiment, the network node is further configured to perform the propagating of the type state estimate to a present time by diffusion of type probabilities towards a constant probability vector.

In a further embodiment, the network node is further configured to perform the propagating of the type state estimate to a present time according to $P(t+T, D|z^t)=P_D+(P(t, D|z^t)-P_D)\alpha^{-\alpha T}$, where $P(t+T, D|z^t)$ is the type state estimate of a present time, $P(t, D|z^t)$ is the type state estimate of a previous time, $P_D$ is the constant probability vector and $\alpha$ is a predetermined propagation constant.

In one embodiment, the kinematic state estimate updates comprises estimated positions and velocities, and covariances therefore, as well as mode probability information.

In one aspect of the presented technology, a wireless communication network, comprising at least one network node according to the description above.

A number of new architecture aspects for a wireless communication network for drone detection functionality may be of interest.

Figure 11:
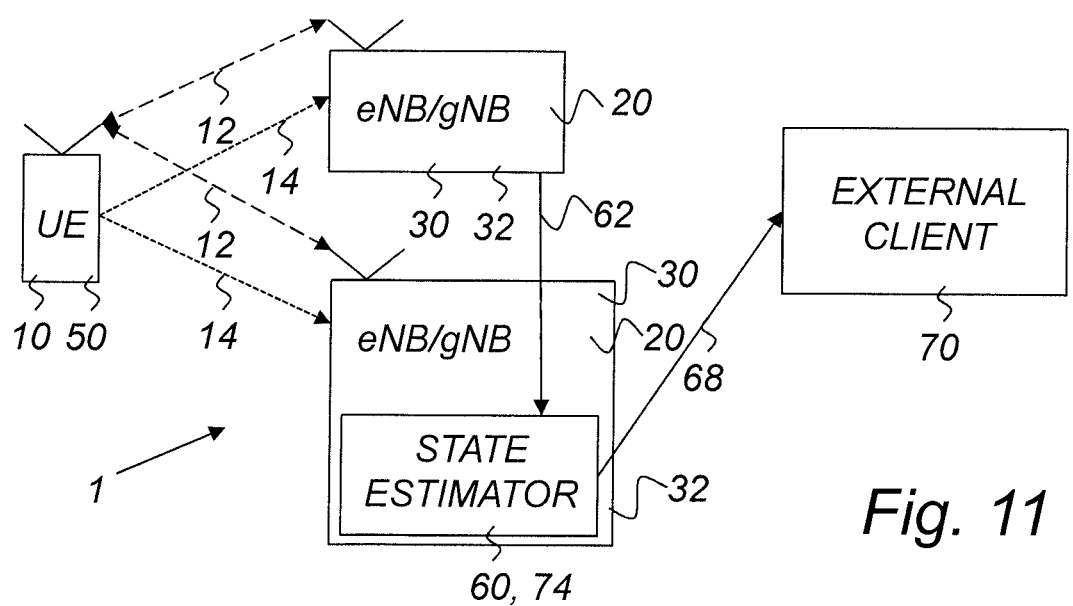
FIGS. 11-18 illustrate architectures for embodiments of systems for type state estimation.

FIG. 11 shows an embodiment of a wireless communication network 1, where a state estimator, configured for performing the type state estimation and preferably also the kinematic state estimation using IMM filtering, is included in a network node 30. The state estimator thus comprises a kinematic state estimator 60 and a type state estimator 74. The network node is in this embodiment a base station 20 and more particularly an eNB/gNB 32. A wireless device 50, in this embodiment the UE 10, cooperates with the eNB/gNB 32, by transmitting signals 12 forth and back to establish a set of range-related measurements. This could e.g. be a set of RTT measurements. The range-related measurements could also be a set of path loss measurements. The range-related measurements could also be a mixture between any such measurements. The UE 10 also sends a message 14 supporting range-related measurements, like UERxTx, to the eNB/gNB 32. The eNB/gNB comprising the UE state estimator measures its own range-related measurements and receives measurement information 62 from the other eNB/gNB 32. In the illustration, only one other eNB/gNB 32 is illustrated, in order to simplify the reading of the drawings, however, as anyone skilled in the art understands, there are typically multiple neighboring eNBs/gNBs 32. The measurement information 62 may comprise range values. However, the measurement information 62 may also only comprise the raw data, such as time stamps for transmission/reception and the UERxTx measurements for the multiple neighbor eNBs/gNBs 32 where the kinematic state estimator computes their range-related set of measurements. The measurements are then used in the kinematic state estimator 60.

There may also be synchronization, time relation and/or setup information that is communicated between the eNBs/gNBs 32.

The state estimator now produces kinematic state estimate information, manifested in an estimated state vector. This obtained kinematic state estimate is used by the type state estimator 74 to produce a type state estimate according to the principles discussed above. An assignment of a UE to be a drone is information that is useful for example for reducing the potential disadvantages of having a drone present in the area as discussed further above. Therefore, new drone type information 68 may be sent to an external client 70 for further use. The external client 70 may reside within the wireless communication system 1 or outside. This provision of new information requires 3GPP protocol extensions. The drone type information, together with the kinematic state estimate information may e.g. be used to prevent UE penetration of restricted airspace.

Figure 12:
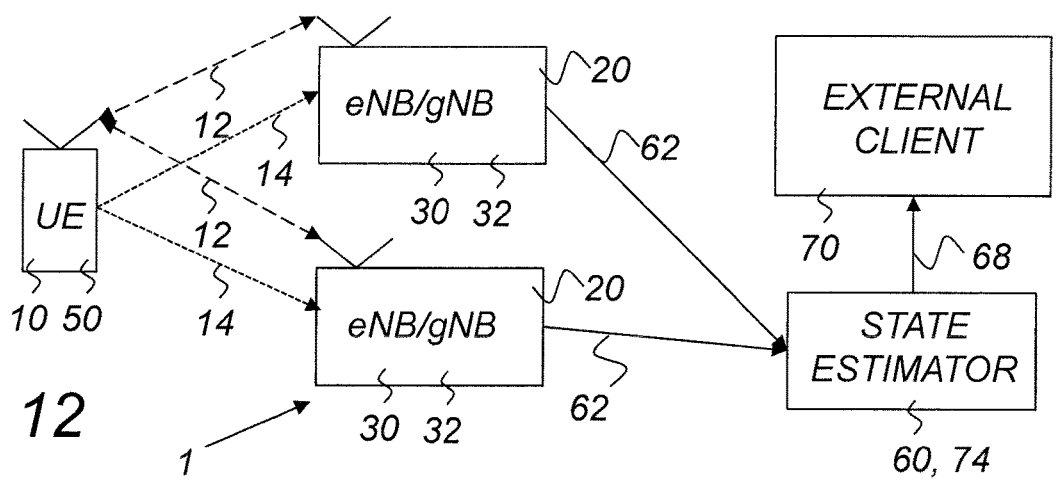

FIG. 12 shows an embodiment where the state estimator is broken out from the eNB/gNB 32 and placed elsewhere in the wireless communication network 1. The eNB/gNB 32 communicates measurement information 62 to the external state estimator 60, 74. Note that this embodiment require that e.g. range measurements are signaled from the measuring eNB/gNB to the node were the estimation is implemented. Today, there are no standards covering such signaling.

Figure 13:
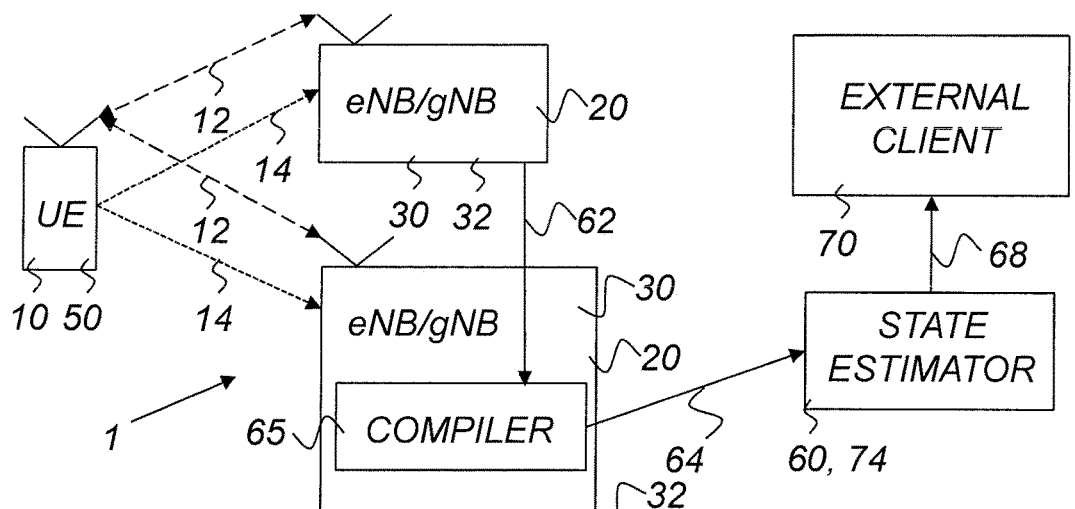

FIG. 13 shows a similar embodiment, but where one of the eNBs/gNBs 32 comprises a compiler 65, compiling the measurement information 62 before it is provided to the external state estimator 60, 74. Also in this embodiment it is required that e.g. range measurements are signaled from the measuring eNB/gNB to the node were the estimation is implemented. Today, there are no standards covering such signaling.

Figure 14:
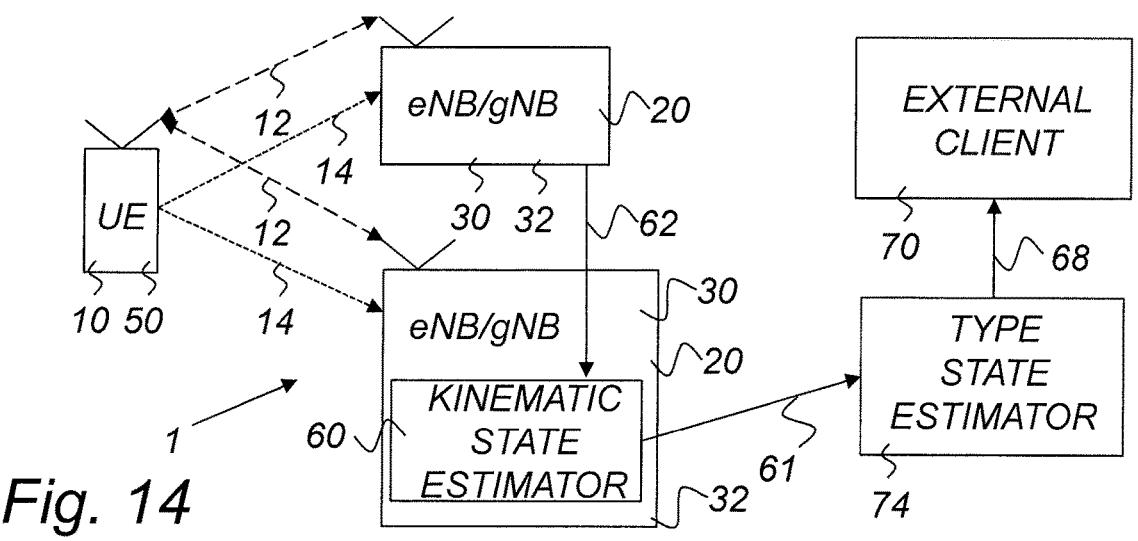

In FIG. 14, the state estimator is separated into two parts, a kinematic state estimator 60 and a type state estimator 74. In such an embodiment, the kinematic state estimator 60 provides the kinematic state estimates to the type state estimator 74. Note that this embodiment require that kinematic state estimations 61 are communicated between the two parts. Today, there are no standards covering such signaling.

Figure 15:
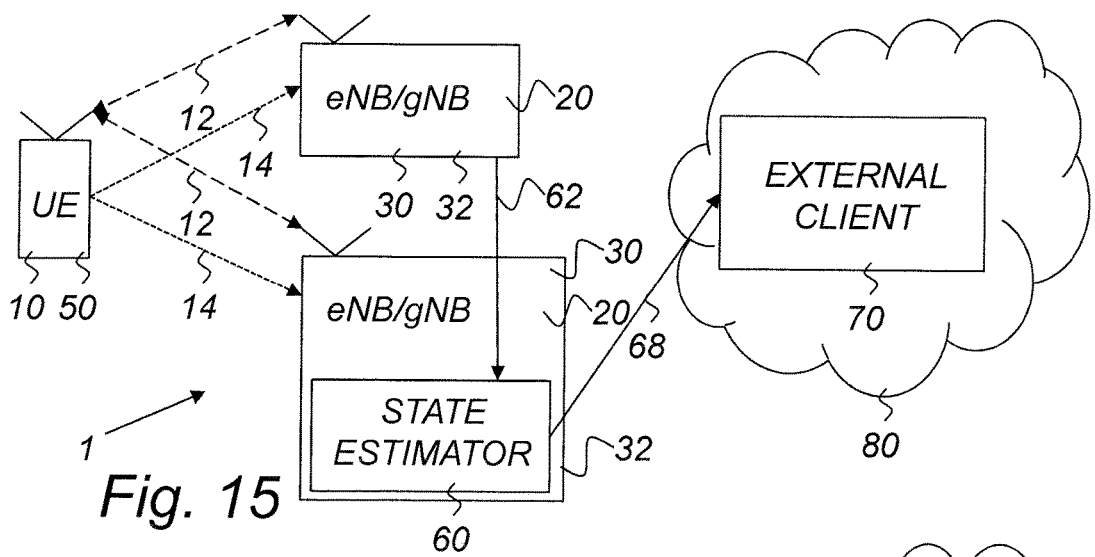
Figure 16:
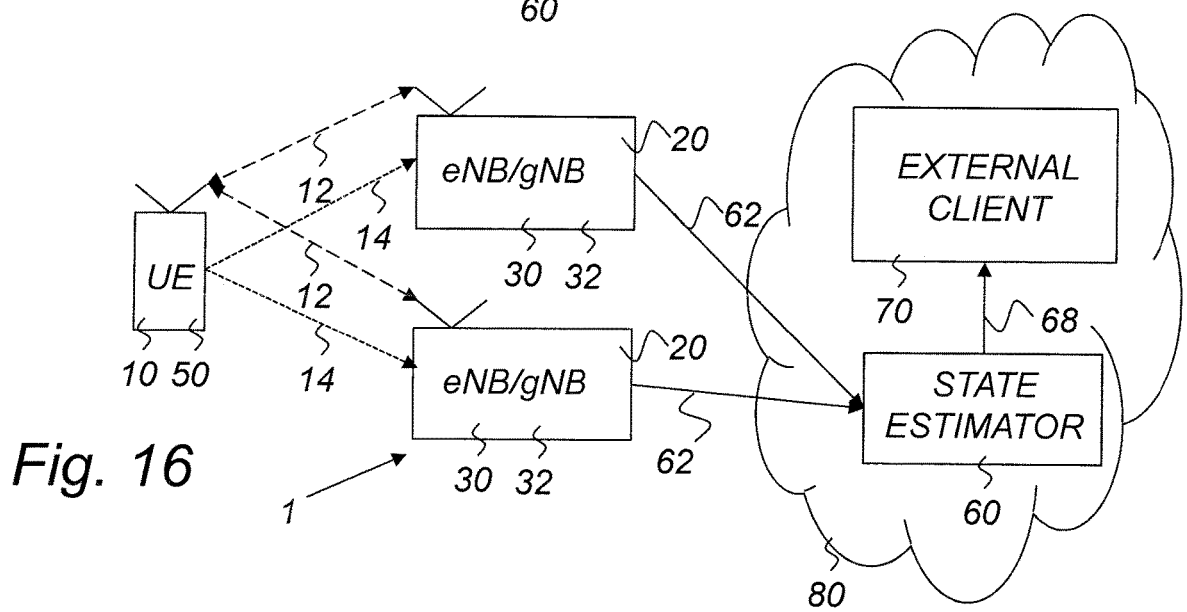

FIG. 15 shows an embodiment where the external client 70 is in a cloud 80. FIG. 16 shows an embodiment were both the state estimator 60 and the external client 70 are in the cloud 80. This embodiment requires signaling of range measurements.

Figure 17:
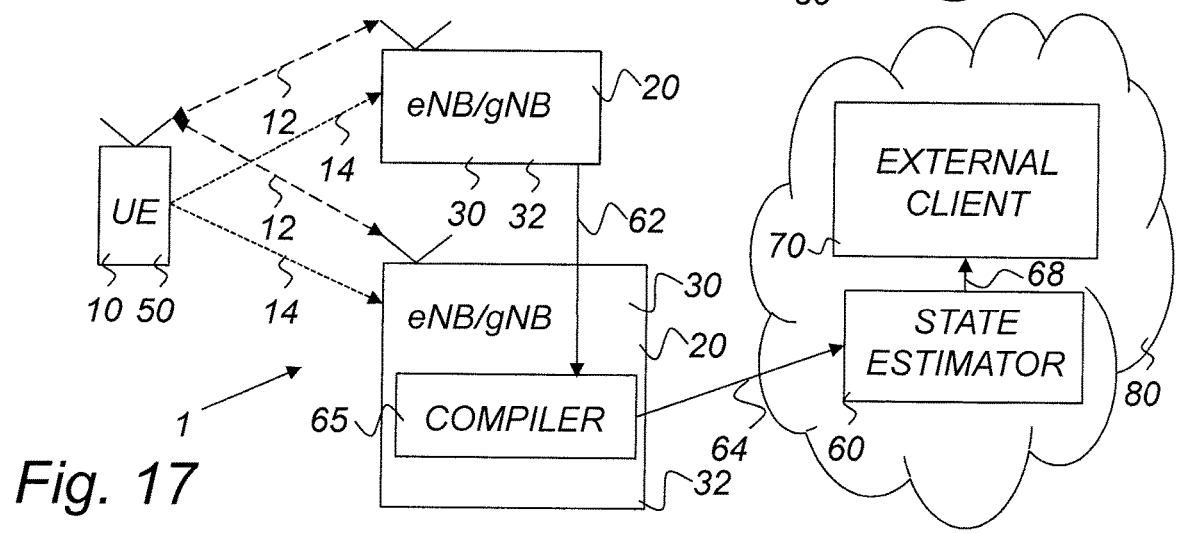
Figure 18:
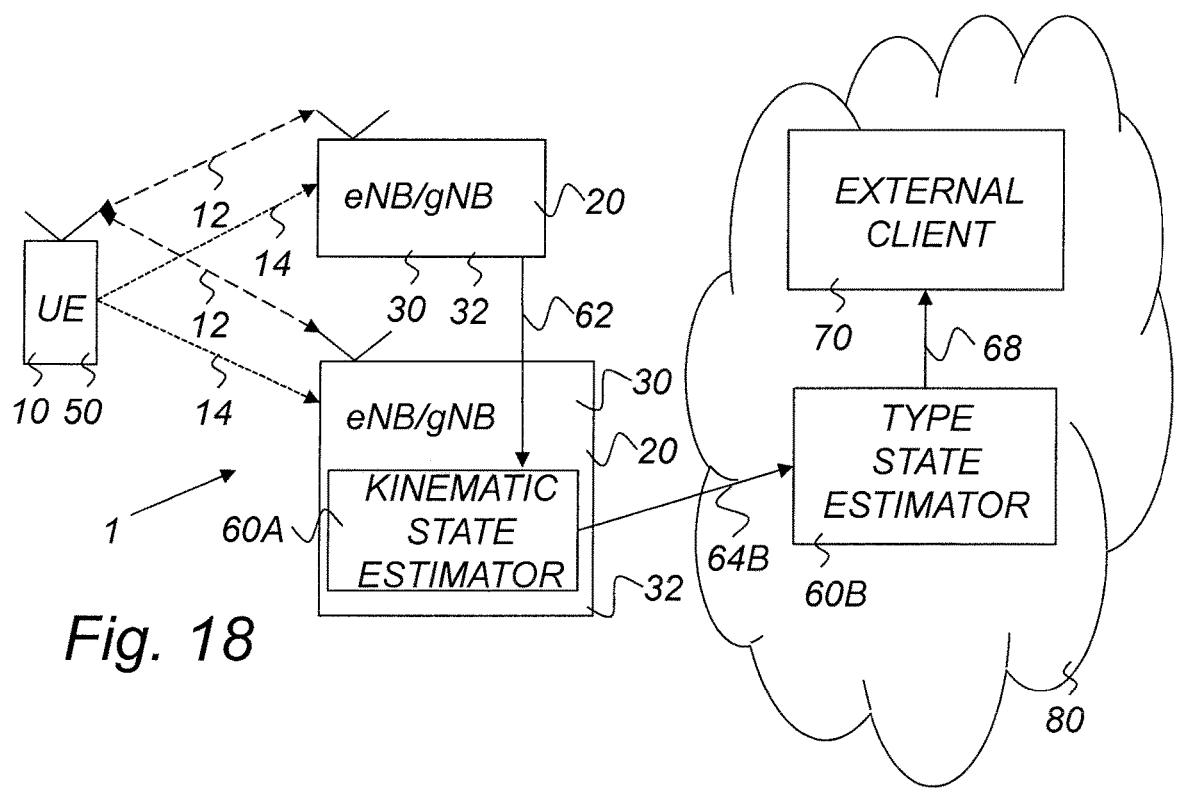

FIG. 17 corresponds to the embodiment of FIG. 13, but with both the state estimator 60 and the external client 70 comprised in the cloud 80. FIG. 18 corresponds to the embodiment of FIG. 14, but with both the type state estimator 60B and the external client 70 comprised in the cloud 80.

The kinematic state estimate information 61 would typically comprise at least a kinematic state estimate information identifier, a UE identity, the time when the kinematic state information is valid, and the actual estimated kinematic state. The kinematic state would at least comprise a 3D position, but preferably also a 3D velocity. The information may also comprise ground altitude information. Alternatively, the ground altitude information could be subtracted from the state information to get the altitude above ground, signaled in the kinematic state estimate information. That would require an additional identifier stating if ground altitude information is subtracted or not.

The drone type information 68 as communicated e.g. to the external client would typically comprise a drone type information identifier, the probability of drone, a drone detected flag, and the time when the drone type information is valid.

Figure 19:
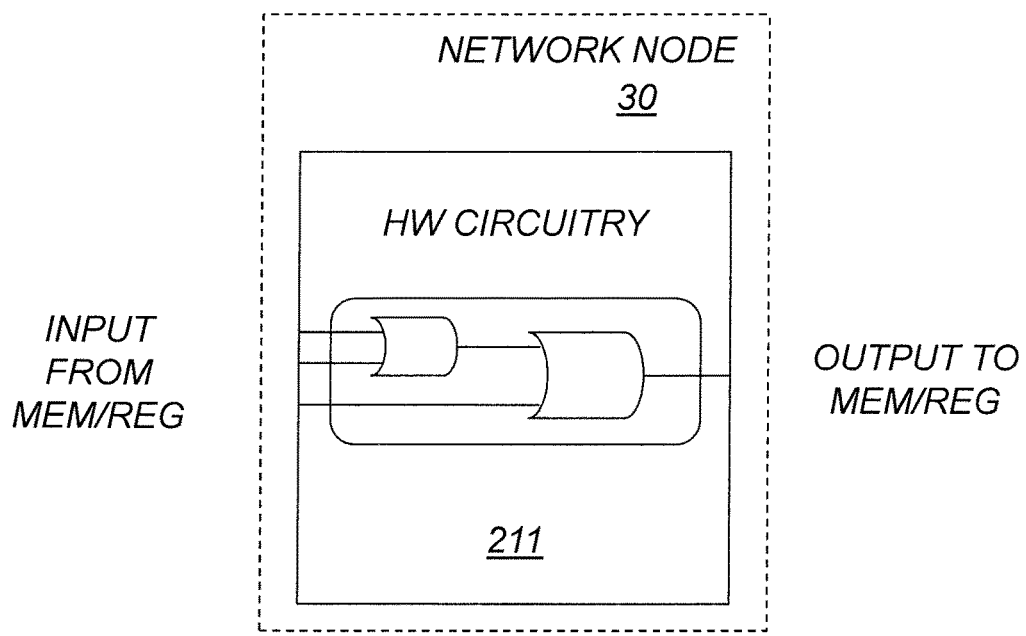
FIG. 19 is a schematic block diagram illustrating an embodiment of a network node based on a hardware circuitry implementation.

FIG. 19 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 20:
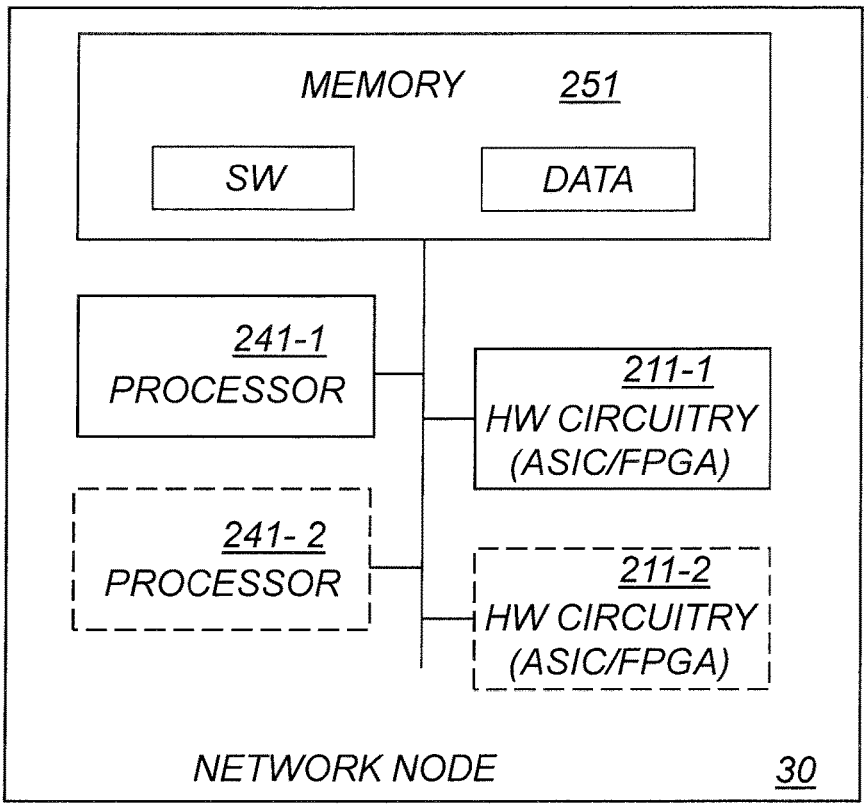
FIG. 20 is a schematic block diagram illustrating another embodiment of a network node based on combination of both processor and hardware circuitry.

FIG. 20 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 21:
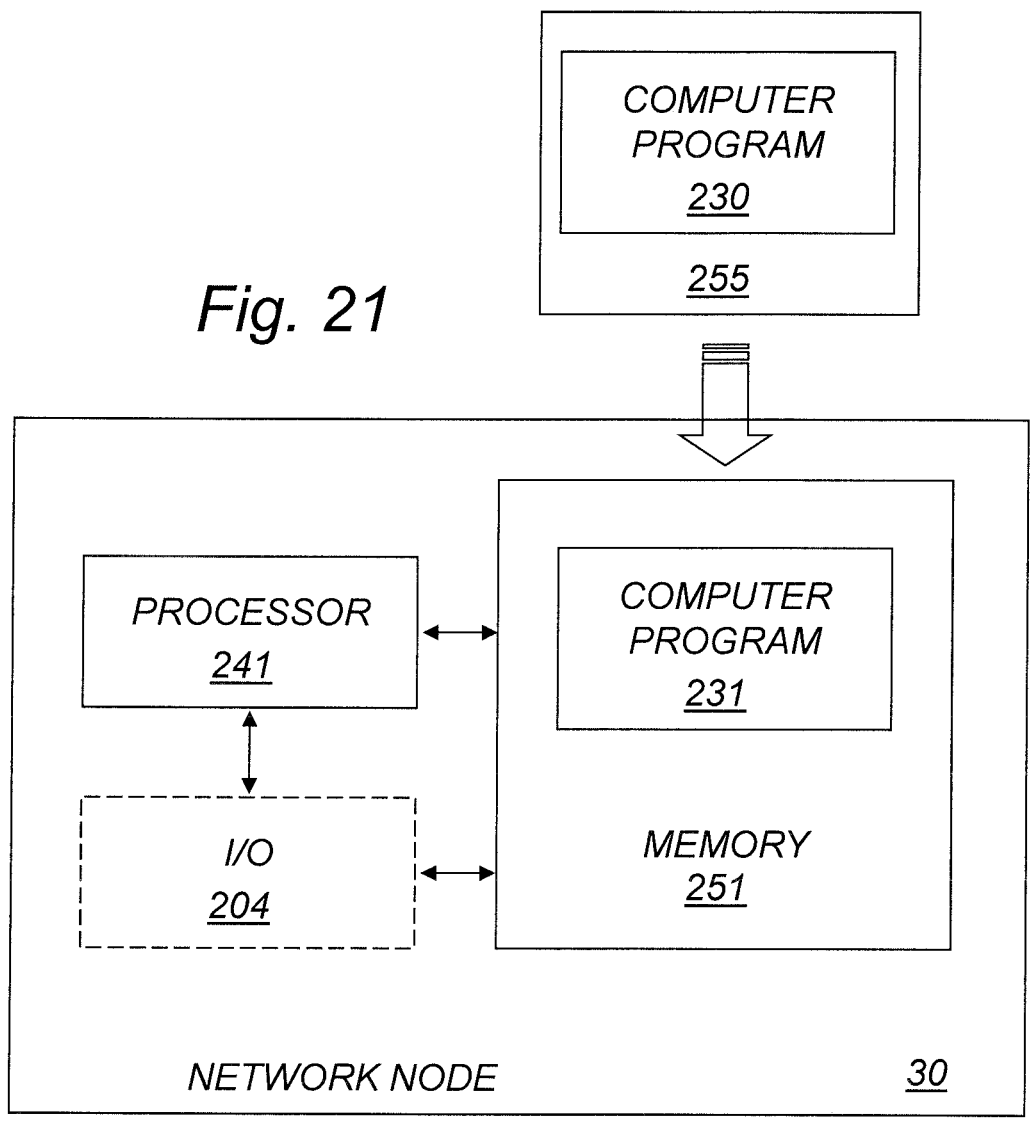
FIG. 21 is a schematic diagram illustrating an embodiment of a computer-implementation of a network node.

FIG. 21 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by at least one processor 241, cause the processor(s) 241 to recursively update a type state estimate. The type state estimate is a probability for the UE to be a drone conditioned on obtained kinematic state estimate updates concerning the UE, and to assign the UE to be a drone as a response on the type state estimate exceeding a threshold.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

In one aspect, a computer-program product comprises a computer-readable medium having stored thereon a computer program as described above.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB), a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 22:
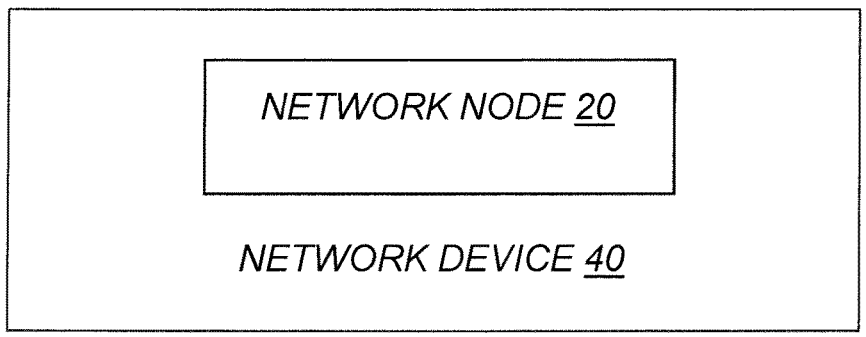
FIG. 22 is a schematic block diagram illustrating an embodiment of a network device.

FIG. 22 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 23:
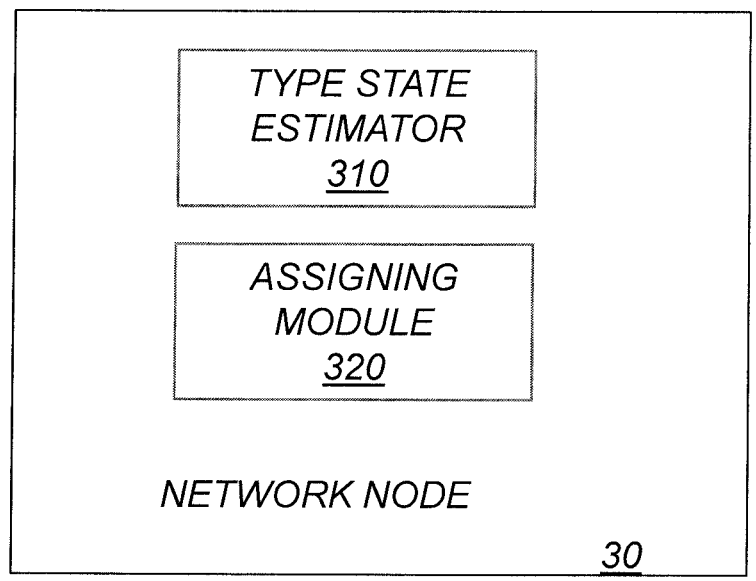
FIG. 23 is a schematic diagram illustrating an embodiment of a network node.

FIG. 23 is a schematic diagram illustrating an example of a network node 30 for type state estimation of a UE connected to a wireless communication network. The network node comprises a type state estimator 310, for recursively updating of a type state estimate. The type state estimate is a probability for the UE to be a drone conditioned on obtained kinematic state estimate updates concerning the UE. The network node 30 further comprises an assigning module 320, for assigning the UE to be a drone as a response on the type state estimate exceeding a threshold.

Alternatively it is possible to realize the module(s) in FIG. 23 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 24:
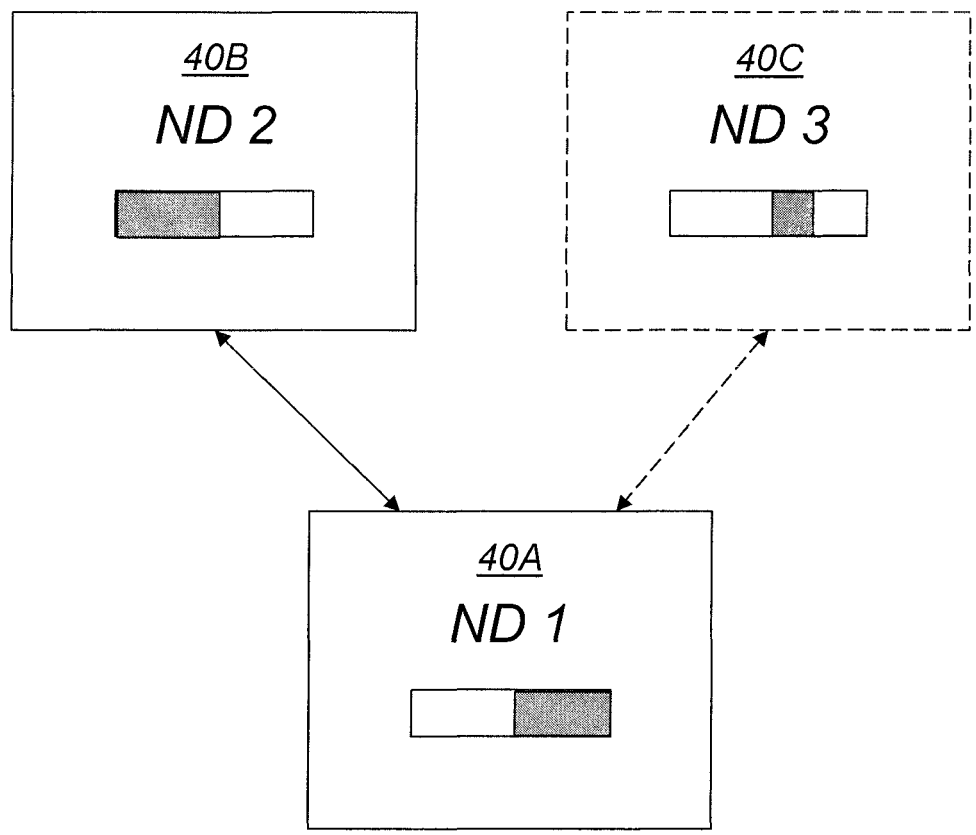
FIG. 24 is a schematic diagram illustrating a general example of functionality distribution or partition.

FIG. 24 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 25:
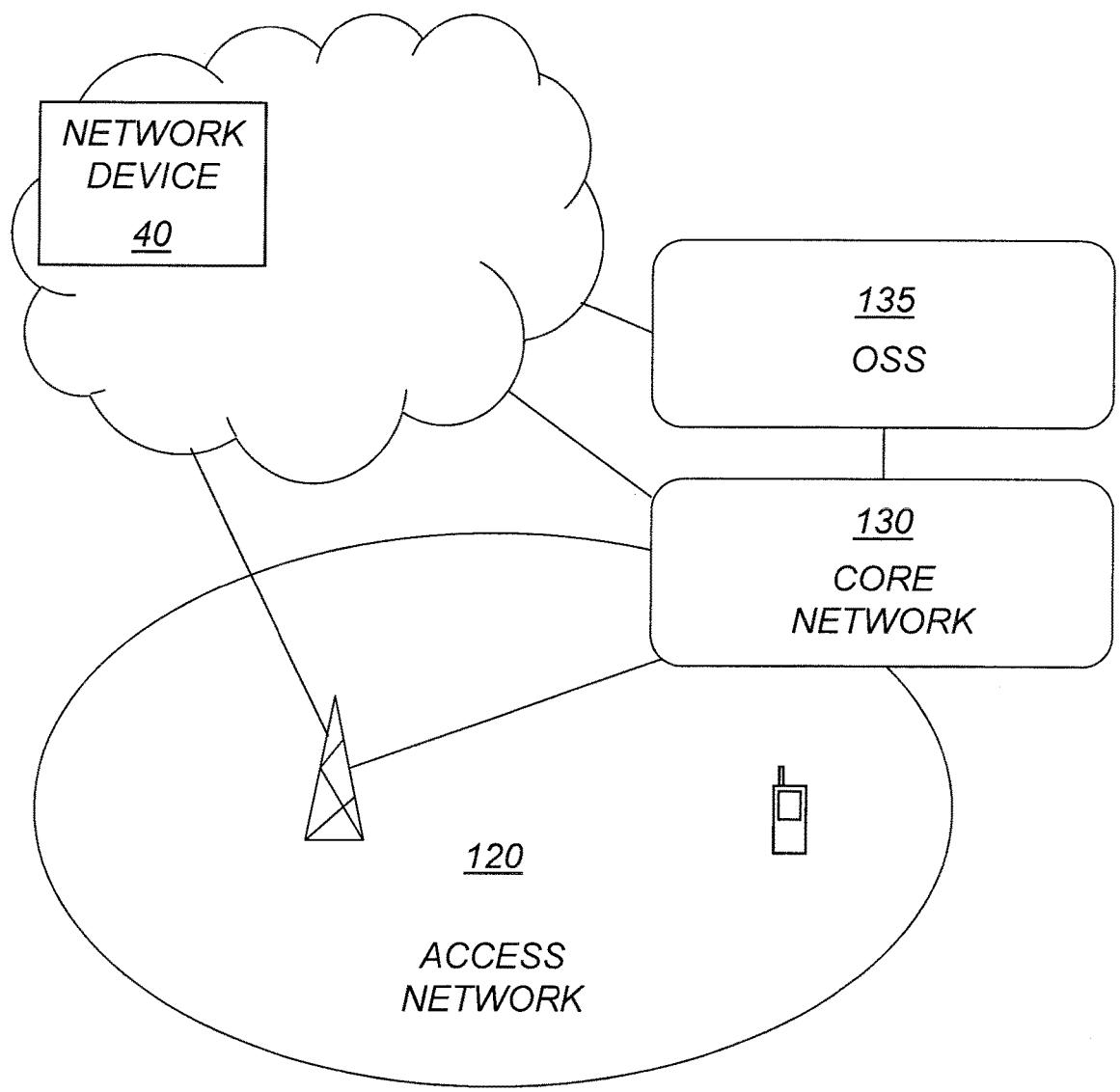
FIG. 25 is a schematic diagram illustrating an example of a wireless communication system in cooperation with one or more cloud-based network devices.

FIG. 25 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

APPENDIX A

Figure 2:
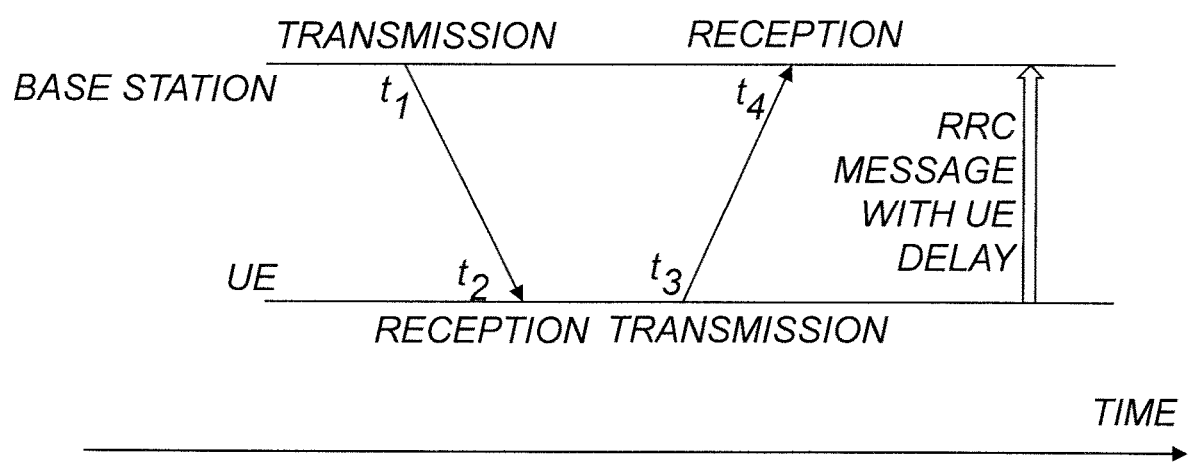
FIG. 2 is an illustration of a round trip time measurement.

A round-trip-time (RTT) measurement measures the travel time of radio waves from a base station to a UE and back. Given the round trip time measurement, the range follows as:

$$R = c\frac{RTT}{2}, \quad (A1)$$

where c denotes the speed of light. The principle of the RTT measurement is illustrated in FIG. 2. A base station transmits a signal at a time instant $t_1$. The signal propagates to the UE, which receives the signal at a time instant $t_2$. The UE replies with a reply signal, which is transmitted at a time instant $t_3$. The reply signal is received in the base station at a time instant $t_4$. The UE keeps track on the delay, UE RxTx, between the reception of the first signal and the transmission of the reply signal and signals this delay time to the base station, typically in a radio resource protocol (RRC) message. The UE RxTx is measured in the UE as:

$$UERxTx = t_3 - t_2 \quad (A2)$$

At the base station side, the true RTT time can then be obtained as:

$$RTT = t_4 - t_1 - UERxTx. \quad (A3)$$

It can be noted that the main contribution of the inaccuracy of the measurement originates from the two reception processes in the UE and the base station. The theoretical inaccuracy of one such measurement is, in free space propagation, inversely proportional to the measurement bandwidth, as:

$$\Delta t \geq \frac{1}{4\pi} \frac{1}{\Delta f}. \quad (A4)$$

This means that in case the measurement bandwidth is for example 30 MHz, then the best time inaccuracy that is possible is 2.65 ns which corresponds to a little less than 1 m, corresponding to a 1 sigma value. Since two independent measurement processes are used for RTT a 40 MHz measurement bandwidth would result in a combined RTT measurement inaccuracy of about 1 m.

APPENDIX B

Figure 3:
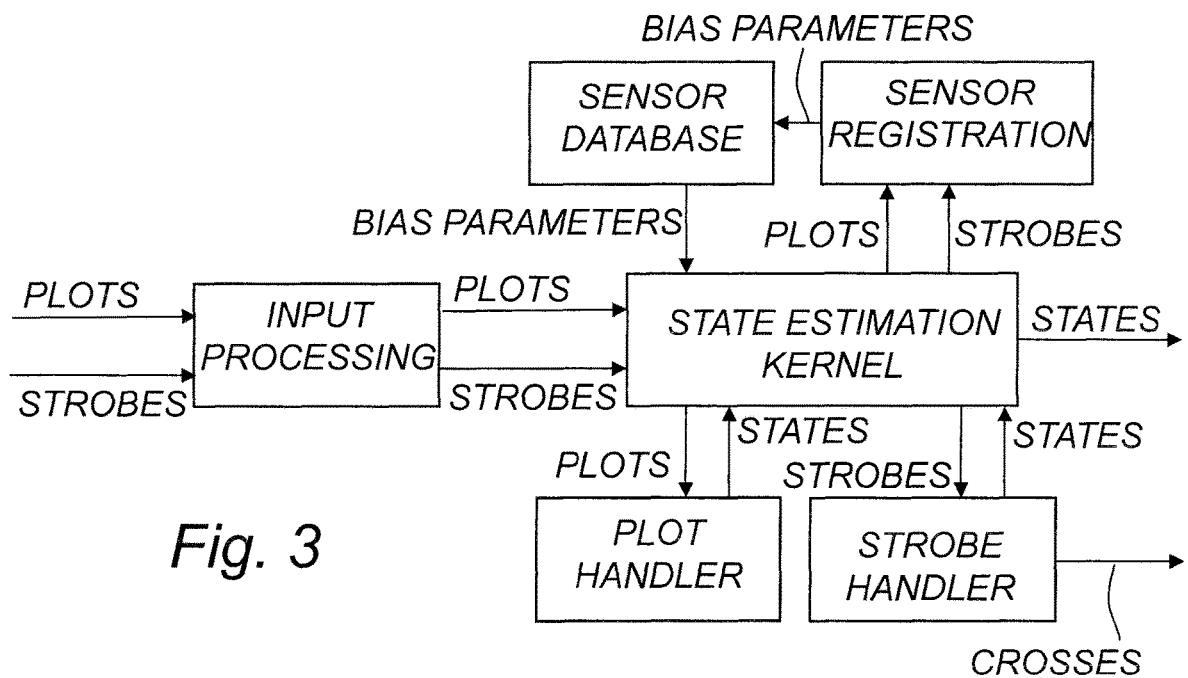
FIG. 3 is an example of a typical object state estimation system.

One example block-diagram of a so-called multi-sensor state estimation system is depicted in FIG. 3.

The operation of this particular system can be briefly explained as follows. Measurements consisting of strobes and plots are first collected from the sensors attached to the moving object estimation system. Strobes are angle-only measurements and plots are Cartesian position measurements. The plots and strobes are sent to an input processing unit for association with existing three-dimensional state estimates. Association is the process of determining which measurements that belong to each state estimate.

The association is performed in the measurement space of each sensor, i.e. the state estimates, which typically reside in an earth tangential Cartesian coordinate system, are transformed to the measurement space of each sensor. Associated data then update state estimates in a state estimation kernel, typically with Kalman filtering techniques, as discussed further below. Plots and strobes that are not associated may originate from new objects and they are sent to the plot handler or the strobe handler for initiation of new state estimates. Crosses are pairs of strobes tentatively associated with new objects. Plots and strobes that are associated to high quality estimates are also used for computation of sensor bias parameters in the sensor registration block.

If such a state estimation technique is implemented in a wireless communication system, the input measurements may be of a range-only character. In other words, the distance to the object of the state estimation from a sensor is measured, but the direction is basically unknown.

Furthermore, some simplifications may be implemented. In a wireless communication system, each UE has a unique ID when attached to the cellular system. This means that the above described association process is not needed. Moreover, the advanced state initiation is not generally needed in the wireless communication system, but the known techniques may be combined with the technology presented here for further enhancement. Finally, the sensor registration described above is typically not needed in the present implementation. However, the known techniques may be combined with the current ideas for further enhancement.

APPENDIX C

There are many known methods for estimation when multiple dynamic modes describe the behavior of an object, whose state is estimated.

A first and most general way of performing such estimation would be to depend on the joint probability distribution of the objects state. The propagation of this state forward in time is known in prior art to be governed by the so-called Fokker-Planck partial differential equation. The measurement processing is performed by a multi-dimensional integration, to obtain the posterior probability state distribution from the likelihood of the measurement and the prior probability distribution. This process is known under the name Bayesian inference. It is, however, immensely more computationally complex and memory intensive than the solution disclosed further below. In passing it can be mentioned that Bayesian inference is today approximated by so-called particle filters, in which the probability density functions are discretized in terms of individual "particles". Since particle filtering is still immensely more complex than the disclosed solution, the details are not discussed further in detail here.

At the other complexity extreme, each mode can be modeled separately and also estimated separately. Then ad hoc logic may be used to select the movement mode. Traditional state estimation for e.g. air vehicles was designed in that way. One movement mode was assumed to be constant velocity movement, i.e. straight line movement, and the other movement mode was a maneuver mode, modeled by a leaky constant velocity movement that responded to measurements with much higher agility than the constant velocity mode. Finally, a maneuver detector was used to choose the maneuver filter in case that was deemed to match measurements better. After the maneuver was terminated a re-initialized constant velocity movement mode was used for state estimation. This approach was robust but suffered from difficulties in the selection of threshold values for the maneuver detector.

A more systematic approach to the state estimation problem at hand is offered by the interacting-multiple-model (IMM) filter that was discovered about 30 years ago.

The IMM algorithm assumes that the system behaves according to one of a finite number of models which is one of several modes. These models can differ in noise levels or their structure, such as different state dimensions and unknown inputs. In the IMM approach, at time k the state estimate is computed under each possible model using r filters, with each filter using a different combination of the previous model-conditioned estimates—mixed initial conditions.

Figure 4:
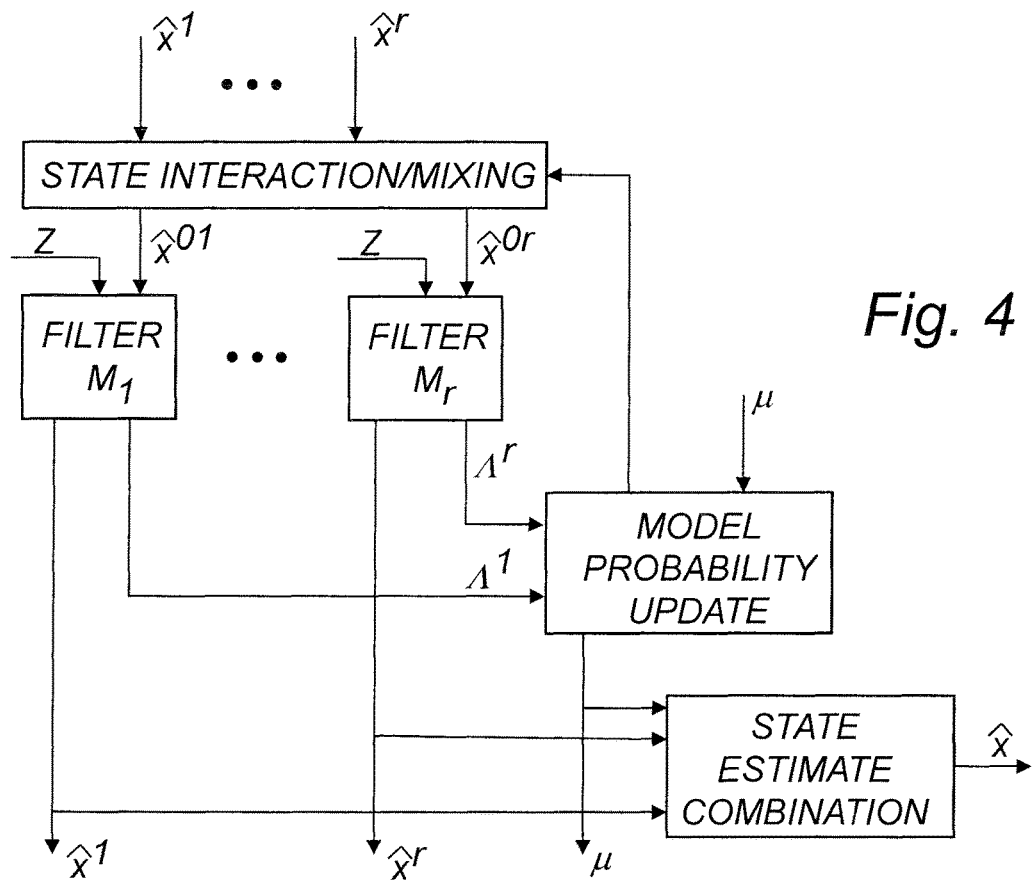
FIG. 4 is a block diagram of an interacting-multiple-model algorithm.

FIG. 4 describes one cycle of the typical IMM algorithm, which consists of r interacting filters operating in parallel. The IMM algorithm is described more in detail in Appendix D.

To set up an IMM filter, three main choices needed to be made. First, the movement modes have to be defined. Secondly, the transition probabilities between the movement modes have to be defined. Finally, the initial conditions of the filters have to be selected.

For each movement mode, this amount to the definition of a state space model, i.e., one vector difference equation that defines the dynamics, and another static vector equation that defines the measurement relation, by mapping states to the measurements. In addition, the inaccuracies of the measurement equation and the dynamic state model needs to be given in terms of the covariance matrices of the uncertainties.

The second choice describes, in terms of a hidden Markov model, how the modes interact, this being expressed in terms of the probabilities of a mode transition of the estimated object, between two discrete instances of time.

The third choice is typically made in terms of the expected initial state and covariance of each model.

All these choices are typically specific for the actual implementation of the IMM and are thus more or less unique for each new implementation.

For each filter $M_j$, j=1, . . . , r, a nonlinear Extended Kalman filter (EKF) is typically used. EKF is based on linear approximations of the nonlinear system. It can be used to estimate the state of a discrete-time dynamic system described by a vector difference equation with additive white Gaussian noise that models unpredictable disturbances.

Figure 5:
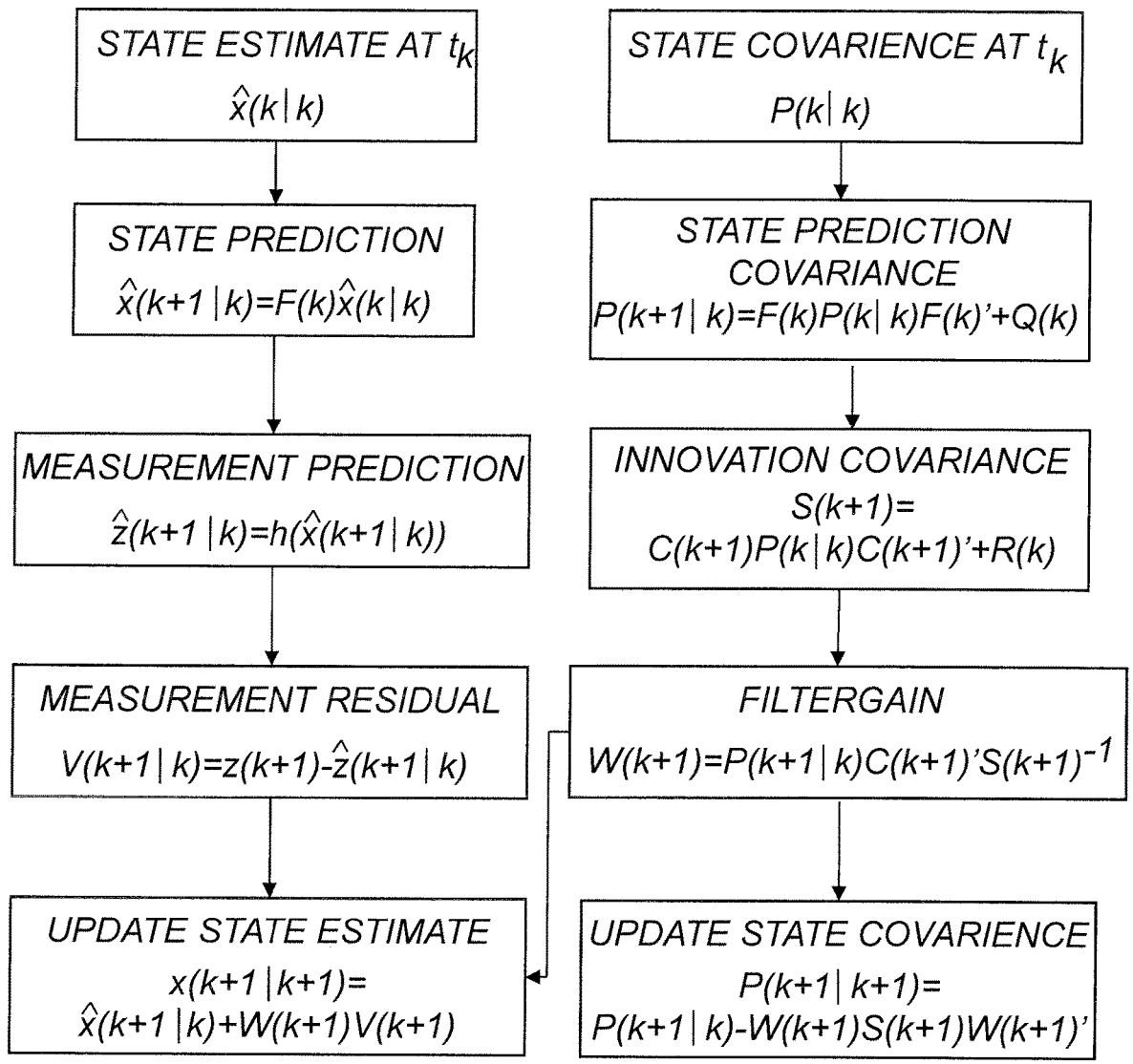
FIG. 5 is a flow diagram of an example of one cycle of a state estimation

A flowchart of a typical EKF filter is shown in FIG. 5, and the EKF is described more in detail in Appendix E.

APPENDIX D

FIG. 4 describes one cycle of the typical IMM algorithm, which consists of r interacting filters operating in parallel. The mixing is done at the input of the filters, at the state interaction/mixing unit, with the probabilities, conditioned on data $Z^{k-1}$. The structure of the IMM algorithm is:

$$(N_e;N_f)=(r;r), \tag{D1}$$

where $N_e$ is the number of estimates at the start of the cycle of the algorithm and $N_f$ is the number of filters in the algorithm.

One cycle of the algorithm consists of the following. Mixing probabilities (i, j=1, . . . , r) are calculated. The probability that mode $M_i$ was in effect at time k−1 given that $M_j$ is in effect at k conditioned on $Z^{k-1}$ is:

$$\mu_{i|j} = \frac{1}{\bar{c}_j} p_{ij}\mu_i(k-1), \tag{D2}$$

where the normalizing constants are given by the below equation. This equation uses the mode transition probabilities pip, which is the respective probability that the estimated object is in mode j at time k, conditioned on being in mode i at time k−1. The expression for the normalizing constant is:

$$\bar{c}_j=\Sigma_{i=1}^r P_{ij}\mu_i(k-1). \tag{D3}$$

Next, mixing is performed for (j=1, . . . r). Starting with $\hat{x}^i(k-1|k-1)$ one components the mixed initial condition for the filter matched to $M_j(k)$ as:

$$\hat{x}^{0j}(k-1|k-1)=\Sigma_{i=1}^r \hat{x}_i(k-1|k-1)\mu_{i|j}(k-1|k-1)j=1, \ldots ,r. \tag{D4}$$

The covariance corresponding to the above is:

$$P^{0j}(k-1|k-1)=\Sigma_{i=1}^r\mu_{i|j}(k-1|k-1)\{P^i(k-1|k-1)+[\hat{x}^i(k-1|k-1)-\hat{x}^{0j}(k-1|k-1)]\cdot[\hat{x}^i(k-1|k-1)-\hat{x}^{0j}(k-1|k-1)]'\}, \tag{D5}$$

with ' denoting the transpose.

Next, mode-matched filtering is performed for (j=1, . . . r). The estimate and the covariance obtained in eq. (5) are used as input to the filter matched to $M_j(k)$, which uses z(k) to yield $\hat{x}^j(k|k)$ and $P^j(k|k)$.

The likelihood function corresponding to the r filters:

$$\Lambda_j(k)=p[z(k)|M_j(k),Z^{k-1}] \tag{D6}$$

are computed using the mixed initial condition and the associated covariance as:

$$\Lambda_j(k)=p[z(k)|M_j(k),\hat{x}^{0j}(k-1|k-1)P^{0j}(k-1|k-1)]j=1, \ldots ,r. \tag{D7}$$

Model probability update is performed for (j=1, . . . , r). This is done as follows:

$$\mu_j(k) = \frac{1}{c}\Lambda_j(k)\bar{c}_j \quad j = 1, \ldots , r, \tag{D8}$$

where $\bar{c}_j$ is given above and $$c=\Sigma_{j=1}^r\Lambda_j(k)\bar{c}_j \tag{D9}$$

is the normalization factor.

Estimate and covariance combination is performed. Combination of the model-conditioned estimates covariances is done according to the mixture equations:

$$\hat{x}(k|k)=\Sigma_{j=1}^r\hat{x}^j(k|k)\mu_j(k)$$

$$P(k|k)=\Sigma_{j=1}^r\mu_j(k)\{P^j(k|k)+[\hat{x}^j(k|k)-\hat{x}(k|k)][\hat{x}^j(k|k)-\hat{x}(k|k)]'\}. \tag{D10}$$

APPENDIX E

The dynamic model of the EKF is:

$$x(k+1)=F(k)x(k)+v(k), \tag{E1}$$

where x(k) is the $n_x$-dimensional state vector, and v(k), k=0,1, . . . is the sequence of zero-mean white Gaussian process noise (also $n_x$ vectors) with covariance:

$$\mathbb{E}[v(k)v(k)']=Q(k). \tag{E2}$$

The measurement equation is:

$$z(k)=h(x(k),k)+w(k)k=1, \tag{E3}$$

with h(·) being a nonlinear function of state and w(k) the sequence of zero-mean Gaussian measurement noise with covariance:

$$\mathbb{E}[w(k)w(k)'] = R(k).  \quad (E4)$$

The matrices F, Q, R and the function h(·) are assumed to be known and possibly time varying. In other words, the system can be time varying and the noises nonstationary. The Jacobian of the measurement model h(x(k), k) with respect to k is defined as:

$$C(k) = \frac{\partial H(x(k), k)}{\partial x(k)}. \quad (E5)$$

The initial state x(0), in general unknown, is modeled as a random variable, Gaussian distributed with known mean and covariance. The two noise sequences and the initial state are assumed to be mutually independent. This constitutes the Linear-Gaussian (LG) assumption.

The conditional mean:

$$\hat{x}(j|k) = \mathbb{E}[x(j)|Z^k], \quad (E6)$$

where $Z^k = \{z(j), j \leq k\}$ denotes the sequence of observations available at time k, is the estimate of the state if j=k and predicted value of the state if j>k. The conditional covariance matrix of x(j) given the data $Z^k$ or the covariance associated with the estimate is:

$$P(j|k) = \mathbb{E}[x(j) - \hat{x}(j|k)][x(j) - R(j|k)]'|Z^k]. \quad (E7)$$

The estimation algorithm starts with the initial estimate $\hat{x}(0|0)$ of x(0) and the associated initial covariance P(0|0), assumed to be available. The second (conditioning) index 0 stands for $Z^0$, the initial information.

One cycle of the dynamic estimation algorithm—the Extended Kalman filter (EKF)—will thus consist of the computations to obtain the estimate:

$$\hat{x}(k|k) = \mathbb{E}[x(k)|Z^k] \quad (E8)$$

which is the conditional mean of the state at time k (the current stage) given the observation up to and including time k, and the associated covariance matrix:

$$P(k|k) = \mathbb{E}[[x(k) - \hat{x}(k|k)][x(k) - (k|k)]'|Z^k]. \quad (E9)$$

APPENDIX F

The following 3-mode model is believed to constitute a new combination of movement modes, adapted to the hovering movement that drones are capable of. The three models are a 3D constant velocity movement Wiener process, a 3D constant acceleration movement Wiener process, and a 3D constant position Wiener process. The notation "constant" allows for minor fluctuations, so that the first model really concerns an almost constant velocity movement, the second model really concerns an almost constant acceleration movement and the third model really concerns an almost hovering constant position movement.

The continuous time state space constant velocity model is described using the states:

$$x(t) = \begin{bmatrix} x_1 \\ x_2 \\ x_3 \\ \dot{x}_1 \\ \dot{x}_2 \\ \dot{x}_3 \end{bmatrix}, \quad (5)$$

where the subscript defines the Cartesian coordinate directions. The model is:

$$\dot{x}(t) = A_1 x(t) + B_1 \hat{v}(t), \quad (6)$$

with $$A_1 = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \end{bmatrix}, B_1 = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \quad (7)$$

The process noise covariance matrix is:

$$Q_{c_1} = \text{diag}([q_{11} q_{12} q_{13}]), \quad (8)$$

where $q_{11}$, $q_{12}$ and $q_{13}$ are the process noise variances.

The continuous time state space constant acceleration model is defined using the states:

$$x(t) = \begin{bmatrix} x_1 \\ x_2 \\ x_3 \\ \dot{x}_1 \\ \dot{x}_2 \\ \dot{x}_3 \\ \ddot{x}_1 \\ \ddot{x}_2 \\ \ddot{x}_3 \end{bmatrix}, \quad (9)$$

where the subscript defines the Cartesian coordinate directions. The model is:

$$\dot{x}(t) = A_2 x(t) + B_2 \hat{v}(t) \quad (10)$$

$$A_2 = \begin{bmatrix} 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix}, B_2 = \begin{bmatrix} 0 & 0 & 0 \\ 0 & 0 & 0 \\ 0 & 0 & 0 \\ 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \quad (11)$$

The process noise covariance matrix is $Q_{c_2}$.

The continuous time state space constant position hovering model is defined by the states:

$$x(t) = \begin{bmatrix} x_1 \\ x_2 \\ x_3 \end{bmatrix}, \quad (12)$$

where the subscript defines the Cartesian coordinate directions. The model is:

$$\dot{x}(t) = A_3 x(t) + B_3 \hat{v}(t) \quad (13)$$

$$A_3 = \begin{bmatrix} 0 & 0 & 0 \\ 0 & 0 & 0 \\ 0 & 0 & 0 \end{bmatrix}, B_3 = \begin{bmatrix} 1 & 0 & 0 \\ 0 & 1 & 0 \\ 0 & 0 & 0.001 \end{bmatrix}. \quad (14)$$

The process noise covariance is $Q_{c_3}$.

Thus, in one embodiment, the performing of a state estimation comprises interacting-multiple-model filtering.

In a further embodiment, the interacting-multiple-model filtering comprises three interacting models. Preferably, the interacting-multiple-model filtering comprises a three-dimensional constant velocity movement Wiener process, a three-dimensional constant acceleration movement Wiener process, and a three-dimensional constant position Wiener process.

Another aspect of the new preferred IMM filtering process, disclosed here, is related to the physics of the drone movement. When the drone is in constant velocity movement, it cannot stop immediately, it rather brakes. This means that the sequence of mode transitions is from mode 1, over mode 2, to mode 3. The direct mode transmission from mode 1 to mode 3 is forbidden. This is reflected by new constraints in the mode transition probability matrix of the IMM filter, namely in:

$$p_{ij} = \begin{bmatrix} p_{11} & p_{12} & p_{13} \\ p_{21} & p_{22} & p_{23} \\ p_{31} & p_{32} & p_{33} \end{bmatrix}. \quad (15)$$

The new restrictions are selected as the following ones:

$$p_{13} \leq \varepsilon_{13}, p_{31} \leq \varepsilon_{31}. \quad (16)$$

Here $\varepsilon_{13}$ and $\varepsilon_{31}$ are both much smaller than 1.

In one embodiment, a nonlinear range measurement model is used, based on a RTT measurement. The RTT based range measurement model is:

$$h(\hat{x}(t)) = \frac{2\sqrt{(\hat{x}_1(k) - x_{s,1}(k))^2 + (\hat{x}_2(k) - x_{s,2}(k))^2 + (\hat{x}_3(k) - x_{s,3}(k))^2}}{c}, \quad (17)$$

where $x_s(\cdot)$ denotes the site position and the constant c is the speed of the light. The derivative of the measurement model is defined as:

$$\frac{\partial h(\hat{x})(k)}{\partial \hat{x}} = \begin{pmatrix} \frac{2(\hat{x}_1(k) - x_{s,1}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \\ \frac{2(\hat{x}_2(k) - x_{s,2}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \\ \frac{2(\hat{x}_3(k) - x_{s,3}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \end{pmatrix}'. \quad (18)$$

In this example it is assumed that the measurement is done with respect to one site, at the time of update. In an application, multiple measurements would appear as new rows. Note also that the Jacobian as given here is for the hovering mode. Obvious modifications appear for the constant velocity and constant acceleration models.

ABBREVIATIONS

ASIC Application Specific Integrated Circuits
BTS Base Transceiver Stations
CD Compact Disc
COTS Common Off-The-Shelf
CPE Customer Premises Equipment
CPU Central Processing Units
DSP Digital Signal Processors
DVD Digital Versatile Disc
EKF Extended Kalman Filter
eNB evolved Node B
FPGA Field Programmable Gate Arrays
GIS Geographical Information System
gNBs Next Generation NodeB
HDD Hard Disk Drive
HW hardware
I/O input/output
IMM Interacting-Multiple-Model
LEE Laptop Embedded Equipment
LG Linear Gaussian
LME Laptop Mounted Equipment
LTE Long-Term Evolution
MEM memory units
NB Node B
ND Network Device
NFV Network Function Virtualization
NI Network Interfaces
NIC Network Interface Controller
NR New Radio
OS Operating System
OSS Operations and Support System
PC Personal Computer
PDA Personal Digital Assistant
PLC Programmable Logic Controllers
RAM Random Access Memory
REG registers
ROM Read-Only Memory
RRU Remote Radio Units
RTT Round Trip Time
STA Station
SW software
UE User Equipment
USB Universal Serial Bus
VM Virtual Machine
VMM Virtual Machine Monitor
VNE Virtual Network Element
WNIC Wireless Network Interface Controller

REFERENCES

[1] T. Wigren, "Wireless hybrid positioning based on surface modeling with polygon support", Proc. VTC 2018 Spring, Porto, Portugal, June, 2018.

The invention claimed is:

1. A method for type state estimation of a user equipment connected to a wireless communication network, wherein said method comprising:
updating, recursively, a type state estimate, being a probability for said user equipment to be a drone conditioned on obtained kinematic state estimate updates concerning said user equipment; and
assigning said user equipment to be a drone as a response on said type state estimate exceeding a threshold; and
wherein an updated type state estimate is equal to a preceding type state estimate probability multiplied with a likelihood of said obtained kinematic state estimate updates and normalized, and wherein said likelihood is a probability of a smooth indicator function, representing a discrimination feature of the kinematic state estimate, where said likelihood is conditioned on the user equipment being a drone.

2. The method for type state estimation according to claim 1, wherein said updating recursively said type state estimate is performed according to:

$$P(D|z^t) \propto P(I(\hat{x},f)|D)P(D|z^{t-1}),$$

where $P(D|z^t)$ is said probability for said user equipment to be a drone conditioned on a present kinematic state estimate update, $P(D|z^{t-1})$ is said probability for said user equipment to be a drone conditioned on a preceding kinematic state estimate update and $P(I(\hat{x}, f)|D)$ is said likelihood of said obtained kinematic state estimate update, $I(\hat{x}, f)$ is said smooth indicator function, $\hat{x}$ is said kinematic state estimate and f is the feature for which the likelihood is evaluated, and where t is time.

3. The method for type state estimation according to claim 1, wherein a model with two type states is used, in which one type state being said probability for said user equipment to be a drone conditioned on obtained kinematic state estimate updates concerning said user equipment and other type state being a probability for said user equipment not to be a drone conditioned on obtained kinematic state estimate updates concerning said user equipment.

4. The method for type state estimation according to claim 3, wherein:
an updated type state estimate of said state of said user equipment not being a drone is equal to a preceding type state estimate probability multiplied with a likelihood of said obtained kinematic state estimate updates and normalized, in which said likelihood is a probability of a smooth indicator function, representing a discrimination feature of the kinematic state estimate, where said likelihood is conditioned on the user equipment not being a drone; or
said updating recursively of said type state estimate is performed according to:

$$P(\neg D|z^t) \propto P(I(\hat{x},f)|\neg D)P(\neg D|z^{t-1}),$$

where $P(\neg D|z^t)$ is said probability for said user equipment to not be a drone conditioned on a present kinematic state estimate update, $P(\neg D|z^{t-1})$ is said probability for said user equipment to not be a drone conditioned on a preceding kinematic state estimate update and $P(I(\hat{x}, f)|\neg D)$ is said likelihood of said obtained kinematic state estimate update, $I(\hat{x}, f)$ is said smooth indicator function, $\hat{x}$ is said kinematic state estimate and f is the feature for which the likelihood is evaluated, and where t is time.

5. The method for type state estimation according to claim 1, wherein:
said discrimination feature of the kinematic state estimate being selected from a list of:
an altitude above ground of the kinematic state estimate;
an altitude velocity of the kinematic state estimate;
a horizontal speed of the kinematic state estimate;
a horizontal position of the kinematic state estimate; and
a magnitude of an acceleration of the kinematic state estimate;
said discrimination feature of the kinematic state estimate being modelled by a Gaussian probability distribution function in the smooth indicator function;
said updating recursively said type state estimate is performed conditioned on at least one of a kinematic state estimate accuracy and kinematic mode probability;
propagating said type state estimate to a present time;
propagating said type state estimate to a present time comprises diffusion of type probabilities towards a constant probability vector;
propagating said type state estimate to a present time is performed according to:

$$P(t+T,D|z^t) = P_D + (P(t,D|z^t) - P_D)\alpha^{-\alpha T},$$

where $P(t+T,D|z^t)$ is said type state estimate of a present time, $(P(t,D|z^t)$ is said type state estimate of a previous time, $P_D$ is said constant probability vector and $\alpha$ is a predetermined propagation constant;
said kinematic state estimate updates comprises estimated positions and velocities, covariances therefore, and mode probability information; or
any combination thereof.

6. A network node for type state estimation of a user equipment connected to a wireless communication network to which said network node is connected, the network node comprising:
a processor; and
a memory comprising a computer program which, when executed by the processor, causes the network node to:
update recursively a type state estimate, being a probability for said user equipment to be a drone conditioned on obtained kinematic state estimate updates concerning said user equipment;
assign said user equipment to be a drone as a response on said type state estimate exceeding a threshold; and
wherein an updated type state estimate is equal to a preceding type state estimate probability multiplied with a likelihood of said obtained kinematic state estimate updates and normalized, and wherein said likelihood is a probability of a smooth indicator function, representing a discrimination feature of the kinematic state estimate, where said likelihood is conditioned on the user equipment being a drone.

7. The network node for type estimation according to claim 6, wherein said network node to update recursively said type state estimate according to:

$$P(D|z^t) \propto P(I(\hat{x},f)|D)P(D|z^{t-1}),$$

where $P(D|z^t)$ is said probability for said user equipment to be a drone conditioned on a present kinematic state estimate update, $P(D|z^{t-1})$ is said probability for said user equipment to be a drone conditioned on a preceding kinematic state estimate update and $P(I(\hat{x}, f)|D)$ is said likelihood of said obtained kinematic state estimate update, $I(\hat{x}, f)$ is said smooth indicator function, $\hat{x}$ is said kinematic state estimate and f is the feature for which the likelihood is evaluated, and where t is time.

8. The network node according to claim 6, wherein a model with two type states is used, in which one type state being said probability for said user equipment to be a drone conditioned on obtained kinematic state estimate updates concerning said user equipment and other type state being a probability for said user equipment not to be a drone conditioned on obtained kinematic state estimate updates concerning said user equipment.

9. The network node according to claim 8, wherein:
an updated type state estimate of said state of said user equipment not being a drone is equal to a preceding type state estimate probability multiplied with a likelihood of said obtained kinematic state estimate updates and normalized, in which said likelihood is a probability of a smooth indicator function, representing a discrimination feature of the kinematic state estimate, where said likelihood is conditioned on the user equipment not being a drone; or
update recursively said type state estimate according to:

$$P(\neg D|z^t) \propto P(I(\hat{x},f)|\neg D)P(\neg D|z^{t-1}),$$

where $P(\neg D|z^t)$ is said probability for said user equipment to not be a drone conditioned on a present kinematic state estimate update, $P(\neg D|z^{t-1})$ is said probability for said user equipment to not be a drone (11) conditioned on a preceding kinematic state estimate update and $P(I(\hat{x}, f)|\neg D)$ is said likelihood of said obtained kinematic state estimate update, $I(\hat{x}, f)$ is said smooth indicator function, $\hat{x}$ is said kinematic state estimate and f is the feature for which the likelihood is evaluated, and where t is time.

10. The network node according to claim 6, wherein:
said discrimination feature of the kinematic state estimate being selected from a list of:
  an altitude above ground of the kinematic state estimate;
  an altitude velocity of the kinematic state estimate;
  a horizontal speed of the kinematic state estimate;
  a horizontal position of the kinematic state estimate;
  a magnitude of an acceleration of the kinematic state estimate;
said discrimination feature of the kinematic state estimate being modelled by a Gaussian probability distribution function in the smooth indicator function;
said update recursively said type state estimate conditioned on at least one of a kinematic state estimate accuracy and kinematic mode probability;
further to propagate said type state estimate to a present time;
further to propagate said type state estimate to a present time by diffusion of type probabilities towards a constant probability vector;
further to propagate said type state estimate to a present time according to:

$$P(t+T,D|z^t) = P_D + (P(t,D|z^t) - P_D)\alpha^{-\alpha T},$$

where $P(t+T,D|z^t)$ is said type state estimate of a present time, $(P(t,D|z^t)$ is said type state estimate of a previous time, $P_D$ is said constant probability vector and $\alpha$ is a predetermined propagation constant;
said kinematic state estimate updates comprises estimated positions and velocities, covariances therefore, and mode probability information; or
any combination thereof.

11. A non-transitory computer-readable storage medium comprising instructions which, when executed by at least one processor is are capable of causing a network node for type state estimation of a user equipment connected to a wireless network to perform operations comprising:
updating, recursively, a type state estimate, being a probability for said user equipment to be a drone conditioned on obtained kinematic state estimate updates concerning said user equipment;
assigning said user equipment to be a drone as a response on said type state estimate exceeding a threshold; and
wherein an updated type state estimate is equal to a preceding type state estimate probability multiplied with a likelihood of said obtained kinematic state estimate updates and normalized, and wherein said likelihood is a probability of a smooth indicator function, representing a discrimination feature of the kinematic state estimate, where said likelihood is conditioned on the user equipment being a drone.

12. The non-transitory computer-readable storage medium according to claim 11, wherein the instructions cause said updating recursively said type state estimate to be performed according to:

$$P(D|z^t) \propto P(I(\hat{x},f)|D)P(D|z^{t-1}),$$

where $P(D|z^t)$ is said probability for said user equipment to be a drone conditioned on a present kinematic state estimate update, $P(D|z^{t-1})$ is said probability for said user equipment to be a drone conditioned on a preceding kinematic state estimate update and $P(I(\hat{x}, f)|D)$ is said likelihood of said obtained kinematic state estimate update, $I(\hat{x}, f)$ is said smooth indicator function, $\hat{x}$ is said kinematic state estimate and f is the feature for which the likelihood is evaluated, and where t is time.

13. The non-transitory computer-readable storage medium according to claim 11, wherein the instructions cause a model with two type states to be used, in which one type state being said probability for said user equipment to be a drone conditioned on obtained kinematic state estimate updates concerning said user equipment and other type state being a probability for said user equipment not to be a drone conditioned on obtained kinematic state estimate updates concerning said user equipment.

14. The non-transitory computer-readable storage medium according to claim 13, wherein the instructions cause performing of operations where:
an updated type state estimate of said state of said user equipment not being a drone is equal to a preceding type state estimate probability multiplied with a likelihood of said obtained kinematic state estimate updates and normalized, in which said likelihood is a probability of a smooth indicator function, representing a discrimination feature of the kinematic state estimate, where said likelihood is conditioned on the user equipment not being a drone; or
said updating recursively of said type state estimate is performed according to:

$$P(\neg D|z^t) \propto P(I(\hat{x},f)|\neg D)P(\neg D|z^{t-1}),$$

where $P(\neg D|z^t)$ is said probability for said user equipment to not be a drone conditioned on a present kinematic state estimate update, $P(\neg D|z^{t-1})$ is said probability for said user equipment to not be a drone (11) conditioned on a preceding kinematic state estimate update and $P(I(\hat{x}, f)|\neg D)$ is said likelihood of said obtained kinematic state estimate update, $I(\hat{x}, f)$ is said smooth indicator function, $\hat{x}$ is said kinematic state estimate and f is the feature for which the likelihood is evaluated, and where t is time.

15. The non-transitory computer-readable storage medium according to claim 11, wherein the instructions cause performing of operations where:
said discrimination feature of the kinematic state estimate being selected from a list of:
  an altitude above ground of the kinematic state estimate;
  an altitude velocity of the kinematic state estimate;
  a horizontal speed of the kinematic state estimate;
  a horizontal position of the kinematic state estimate;
  a magnitude of an acceleration of the kinematic state estimate;
said discrimination feature of the kinematic state estimate being modelled by a Gaussian probability distribution function in the smooth indicator function;

said updating recursively said type state estimate is performed conditioned on at least one of a kinematic state estimate accuracy and kinematic mode probability;

propagating said type state estimate to a present time;

propagating said type state estimate to a present time comprises diffusion of type probabilities towards a constant probability vector;

propagating said type state estimate to a present time is performed according to:

$$P(t+T,D|z^t) = P_D + (P(t,D|z^t) - P_D)\alpha^{-\alpha T},$$

where $P(t+T,D|z^t)$ is said type state estimate of a present time, $(P(t,D|z^t)$ is said type state estimate of a previous time, $P_D$ is said constant probability vector and $\alpha$ is a predetermined propagation constant;

said kinematic state estimate updates comprises estimated positions and velocities, covariances therefore, and mode probability information; or any combination thereof.

* * * * *